(12) United States Patent
Nomura

(10) Patent No.: US 11,300,220 B2
(45) Date of Patent: Apr. 12, 2022

(54) VALVE DEVICE

(71) Applicant: DENSO CORPORATION, Kariya (JP)

(72) Inventor: Ryo Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/083,540

(22) Filed: Oct. 29, 2020

(65) Prior Publication Data

US 2021/0140555 A1 May 13, 2021

(30) Foreign Application Priority Data

Nov. 7, 2019 (JP) .............................. JP2019-202525

(51) Int. Cl.
*F16K 27/04* (2006.01)
*F01P 7/14* (2006.01)
*F16K 11/076* (2006.01)

(52) U.S. Cl.
CPC .............. *F16K 27/041* (2013.01); *F01P 7/14* (2013.01); *F16K 11/076* (2013.01); *F01P 2007/146* (2013.01)

(58) Field of Classification Search
CPC ................................. F16K 27/041; F01P 7/14
See application file for complete search history.

(56) References Cited

U.S. PATENT DOCUMENTS

| | | | | |
|---|---|---|---|---|
| 10,975,975 B2* | 4/2021 | Sato | ....................... | F16K 5/0689 |
| 11,085,549 B1* | 8/2021 | Sugino | .................. | B60C 29/002 |
| 11,098,807 B2* | 8/2021 | Suzuki | ................ | F16K 11/0856 |
| 11,125,412 B2* | 9/2021 | Dubuc | ................. | F21V 33/0044 |
| 11,149,627 B2* | 10/2021 | Sano | ......................... | F01P 7/14 |
| 11,149,862 B2* | 10/2021 | Kanzaki | ................... | F16K 11/04 |
| 11,149,865 B2* | 10/2021 | Nakaoka | ............. | F02M 63/0077 |
| 11,162,601 B2* | 11/2021 | Kanzaki | ................ | F16K 11/076 |
| 2015/0075658 A1 | 3/2015 | Tsuchiya et al. | | |
| 2016/0102765 A1* | 4/2016 | McEvoy | .............. | F15B 15/1438 137/15.18 |
| 2020/0109787 A1 | 4/2020 | Tsuji | | |
| 2021/0080014 A1* | 3/2021 | Sato | ....................... | F16K 11/076 |

OTHER PUBLICATIONS

U.S. Appl. No. 17/083,422, to Kanzaki, entitled "Valve Device", filed Oct. 29, 2020 (34 pages).
U.S. Appl. No. 17/083,524, to Kanzaki, entitled "Valve Device", filed Oct. 29, 2020 (40 pages).
U.S. Appl. No. 17/083,422, filed Oct. 29, 2020, Valve Device.
U.S. Appl. No. 17/083,524, filed Oct. 29, 2020, Valve Device.
U.S. Appl. No. 17/083,540, filed Oct. 29, 2020, Valve Device.

* cited by examiner

*Primary Examiner* — Kevin R Barss
(74) *Attorney, Agent, or Firm* — Nixon & Vanderhye P.C.

(57) ABSTRACT

A rotary-type valve device includes a driving unit, a shaft, a valve, and a housing. The valve includes an outer circumferential portion that defines an outer circumferential opening. The housing defines a valve housing space, an inlet opening, and an outlet opening. The valve includes a passage and a valve end surface that faces the housing and that defines an end surface opening. The housing includes a housing inner surface that faces the valve end surface. The valve is housed in the housing so that a gap is defined between the valve end surface and the housing inner surface. The housing inner surface includes a protrusion protruding in the axial direction from the housing inner surface.

12 Claims, 21 Drawing Sheets

VALVE DEVICE

CROSS REFERENCE TO RELATED APPLICATION

This application is based on Japanese Patent Application No. 2019-202525 filed on Nov. 7, 2019, the disclosure of which is incorporated herein by reference in its entirety.

TECHNICAL FIELD

The present disclosure relates to a rotary valve device.

BACKGROUND

A rotary valve having a cylindrical shape includes a rotor that is rotatable and a casing. The rotor defines a rotor outer circumferential opening in an outer circumferential portion of the rotor and the casing defines an outlet opening. The rotary valve allows a fluid flowing into the rotor to flow out through the outlet opening by overlapping the outlet opening with the rotor outer circumferential opening.

SUMMARY

A rotary valve device includes a driving unit, a shaft, a valve, and a housing. The driving unit is configured to transmit a rotational force. The shaft is configured to rotate by the rotational force transmitted from the driving unit. The valve has a tubular shape and configured to rotate together with the shaft. The valve includes an outer circumferential portion that is located outside of the shaft in a radial direction of the shaft and that defines an outer circumferential opening. The housing defines a valve housing space, an inlet opening at a portion of the housing facing the outer circumferential portion, and an outlet opening at a portion of the housing facing the outer circumferential portion. The valve housing space is a space in which the valve is housed. The inlet opening is an opening through which a fluid flows into the valve housing space from an outside of the valve housing space. The outlet port is an opening through which the fluid flows out of the valve housing space to the outside of the valve housing space. The valve defines a passage through which the fluid flows therein and includes a valve end surface that faces the housing in an axial direction of the shaft. The valve end surface defines an end surface opening in fluid communication with the passage. The valve is configured to adjust an overlapping area between the outer circumferential opening and one of the inlet port and the outlet port in accordance with a rotational position of the valve. The housing includes a housing inner surface that faces the valve end surface and the valve is housed in the housing so that a gap is defined between the valve end surface and the housing inner surface. The housing inner surface includes a protrusion at a position radially outward of the shaft. The protrusion protrudes in the axial direction from the housing inner surface.

DETAILED DESCRIPTION

Figure 1:
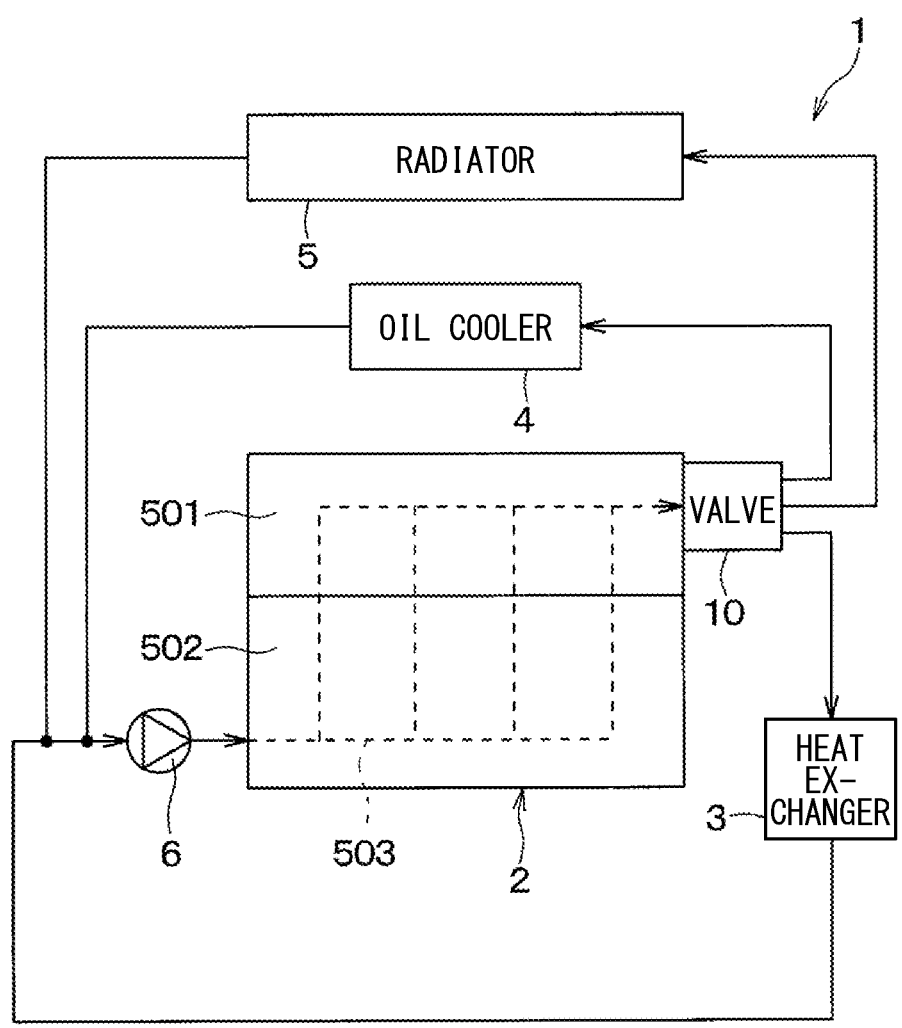
FIG. 1 is a schematic diagram of a cooling system using a valve device according to a first embodiment.

To begin with, examples of relevant techniques will be described.

A rotary valve having a cylindrical shape includes a rotor that is rotatable and a casing. The rotor defines a rotor outer circumferential opening in an outer circumferential portion of the rotor and the casing defines an outlet opening. The rotary valve allows a fluid flowing into the rotor to flow out through the outlet opening by overlapping the outlet opening with the rotor outer circumferential opening.

The rotor further includes a rotor outer circumferential closing surface in the outer circumferential portion of the rotor. The rotary valve overlaps the rotor outer circumferential closing surface with the outlet opening to close the rotor. That is, the rotary valve is an on-off valve that selectively opens and closes the rotor by rotating the rotor.

In addition, the rotary valve defines enough spaces between the outer circumferential portion of the rotor and an inner surface of the casing facing the outer circumferential portion and between an end surface opening of the rotor and the inner surface of the casing facing the end surface opening of the rotor. Thus, the rotary valve defines a passage for the fluid not only inside the rotor but also outside the rotor in the casing. As a result, the rotary valve can flow the fluid at a large flow rate against a size of the rotary valve when the fluid flows out of the outlet opening through the rotor outer circumferential opening.

Here, it is considered to use the rotary valve as a flow rate adjusting valve capable of adjusting a flow rate of the fluid flowing out through the outlet opening. Specifically, it is considered that the rotary valve adjust the flow rate of the fluid flowing out through the outlet opening by adjusting a rotational position of the rotor and an overlapping area between one of the outlet opening and the inlet opening and the rotor outer circumferential opening.

However, since the rotary valve has a sufficient gap between the end surface opening of the rotor and the inner surface of the casing, a part of the fluid flowing into the rotor does not flow to the rotor outer circumferential opening and flows into an outside of the rotor through the end surface opening. That is, the fluid flows out through the end surface opening even if the overlapping area between the one of the outlet opening or the inlet opening and the rotor outer circumferential opening is adjusted. Therefore, even when the rotary valve tries to control the flow rate of the fluid flowing out of the outlet opening by adjusting the overlapping area, the flow rate of the fluid flowing out of the outlet opening varies. The rotor serves as a valve of the valve device.

It is objective of the present disclosure to provide a rotary valve device capable of accurately adjusting an outflow amount of a fluid.

A rotary valve device includes a driving unit, a shaft, a valve, and a housing. The driving unit is configured to transmit a rotational force. The shaft is configured to rotate by the rotational force transmitted from the driving unit. The valve has a tubular shape and configured to rotate together with the shaft. The valve includes an outer circumferential portion that is located outside of the shaft in a radial direction of the shaft and that defines an outer circumferential opening. The housing defines a valve housing space, an inlet opening at a portion of the housing facing the outer circumferential portion, and an outlet opening at a portion of the housing facing the outer circumferential portion. The valve housing space is a space in which the valve is housed. The inlet opening is an opening through which a fluid flows into the valve housing space from an outside of the valve housing space. The outlet port is an opening through which the fluid flows out of the valve housing space to the outside of the valve housing space. The valve defines a passage through which the fluid flows therein and includes a valve end surface that faces the housing in an axial direction of the shaft. The valve end surface defines an end surface opening in fluid communication with the passage. The valve is configured to adjust an overlapping area between the outer circumferential opening and one of the inlet port and the outlet port in accordance with a rotational position of the valve. The housing includes a housing inner surface that faces the valve end surface and the valve is housed in the housing so that a gap is defined between the valve end surface and the housing inner surface. The housing inner surface includes a protrusion at a position radially outward of the shaft. The protrusion protrudes in the axial direction from the housing inner surface.

In this way, when the housing inner surface includes the protrusion located radially outward of the shaft and protruding in the axial direction, the protrusion serves as a resistance to restrict the fluid from flowing into the gap between the valve end surface and the housing inner surface. According to this, the valve device can restrict the fluid from flowing into the gap between the valve end surface and the housing inner surface and from flowing out of the gap. Thus, the valve device can reduce a variation of an outflow amount of the fluid through the outlet opening which is generated when the fluid flows in and out of the gap between the valve end surface and the housing inner surface.

Embodiments of the present disclosure will be described below with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. In the following embodiments, the embodiments can be partially combined with each other as long as the embodiments do not cause any trouble in combination, even if the combination is not specified in particular.

First Embodiment

A first embodiment will be described with reference to FIGS. 1 to 11. A valve device 10 in this embodiment is a so-called rotary valve device. The valve device 10 is applied to a cooling system 1 configured to circulate a cooling water for cooling an internal combustion engine 2 of a vehicle. The valve device 10 controls a flow rate of the cooling water circulating through the cooling system 1. The cooling water is, for example, a fluid containing ethylene glycol as a main component. Other liquids may be used as the cooling water.

As shown in FIG. 1, the cooling system 1 includes the valve device 10, the internal combustion engine 2, an air-conditioning heat exchanger 3, an oil cooler 4, a radiator 5, and a water pump 6.

The internal combustion engine 2 includes a cylinder head 501 that houses a spark plug and the like, a cylinder block 502 that houses a cylinder and the like, and a water jacket 503 that is a passage for the cooling water. The cooling water flowing through the water jacket 503 is heated by exchanging heat with heat generated when the cylinder and the like is operated. The valve device 10 is connected to an outlet of the water jacket 503.

The valve device 10 is located at a portion of the cylinder head 501 where the outlet of the water jacket 503 is arranged and the cooling water having been heated after flowing through the water jacket 503 flows into the valve device 10. The valve device 10 is configured to flow a required amount of the cooling water respectively to the air-conditioning heat exchanger 3, the oil cooler 4, and the radiator 5.

The air-conditioning heat exchanger 3 dissipates a heat of the cooling water by exchanging heat between the cooling water flowing out of the valve device 10 and an air flowing into a vehicle cabin. The water pump 6 is connected to a position downstream of the air-conditioning heat exchanger 3, so that the cooling water having flown through the air-conditioning heat exchanger 3 flows to the water pump 6.

The oil cooler 4 cools an oil by exchanging heat between the cooling water flowing out of the valve device 10 and the oil. The water pump 6 is connected to a position downstream of the oil cooler 4, so that the cooling water having flown through the oil cooler 4 flows to the water pump 6.

The radiator 5 dissipates a heat of the cooling water by exchanging the cooling water flowing out of the valve device 10 with an outside air. The water pump 6 is connected to a position downstream of the radiator 5, so that the cooling water having flown through the radiator 5 flows to the water pump 6.

The water pump 6 has an upstream end connected to the air-conditioning heat exchanger 3, the oil cooler 4, and the radiator 5 and a downstream end connected to an inlet of the water jacket 503. The water pump 6 is configured to pressurize the cooling water having flown out of the air-conditioning heat exchanger 3, the oil cooler 4, and the radiator 5 and flow the cooling water after being pressurized into the water jacket 503.

As described above, in the cooling system 1, the water pump 6 circulates the cooling water and the valve device 10 supplies a required amount of the cooling water to each of the air-conditioning heat exchanger 3, the oil cooler 4, and the radiator 5.

Figure 2:
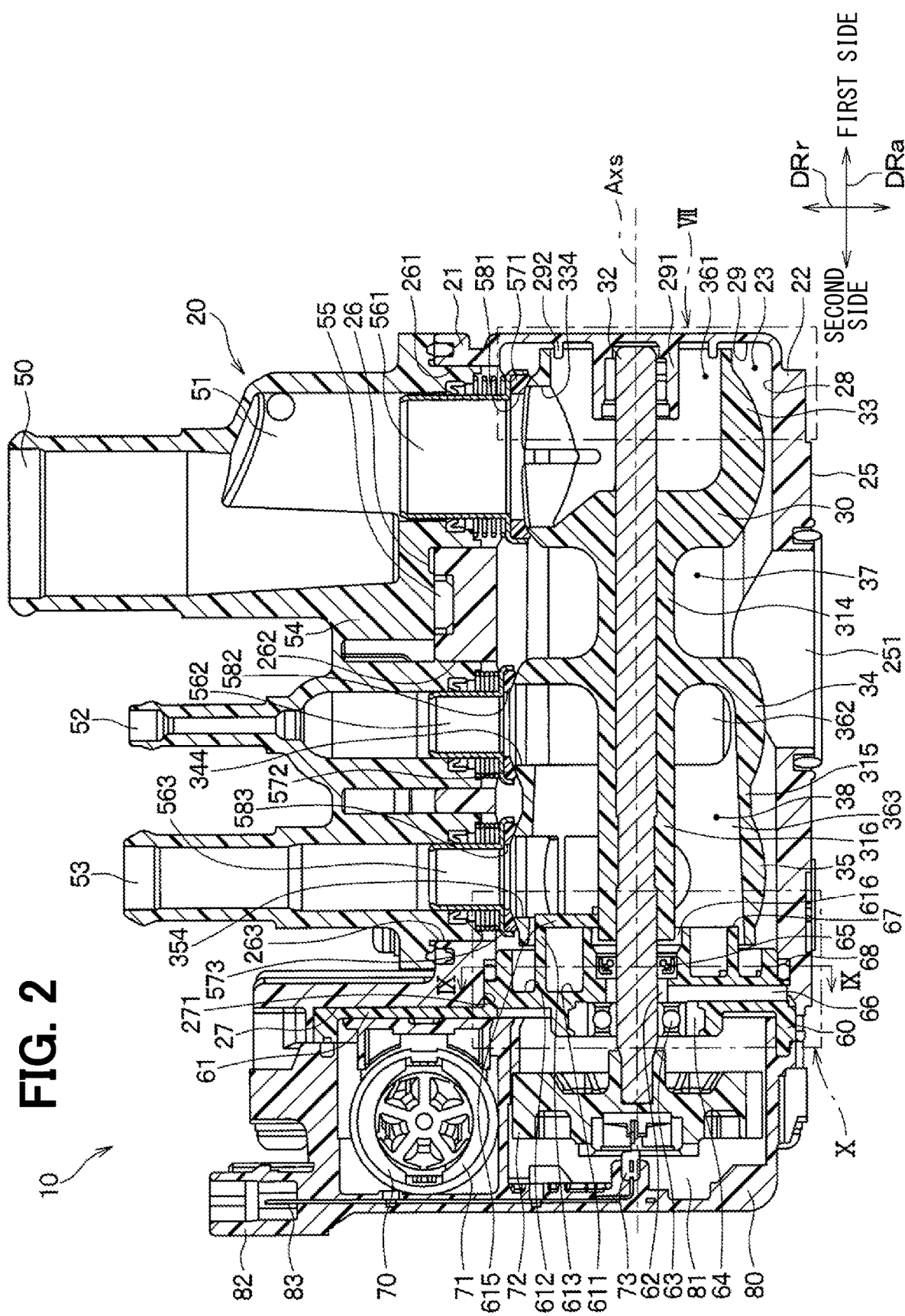
FIG. 2 is a schematic cross-sectional view of the valve device according to the first embodiment.

Next, the valve device 10 will be described. As shown in FIG. 2, the valve device 10 includes a housing 20, a valve 30, a driving unit 70, a driving unit cover 80, and the like. The valve device 10 is configured as a ball valve that selectively opens and closes the valve device 10 by rotating the valve 30 about an axis Axs of a shaft 32 that will be described later. A direction along the axis Axs of the shaft 32 is defined as an axial direction DRa and a direction perpendicular to the axial direction DRa and radially extending from the axial direction DRa is defined as a radial direction DRr.

The housing 20 houses the valve 30. The housing 20 is made of, for example, a resin material or the like. The housing 20 includes a housing body 21 that has a hollow shape and houses the valve 30, a pipe member 50 through which the cooling water flows out of the housing body 21, and a partition wall 60 attached to the housing body 21.

The housing body 21 has a substantially rectangular parallelepiped appearance and has a bottomed shape. The housing body 21 defines an opening in a second side of the housing body 21 in the axial direction DRa and includes a housing outer wall 22 that constitutes an outer circumference of the housing body 21. The housing outer wall 22 defines a valve housing space 23 having a cylindrical shape and an axis in the axial direction DRa inside the housing body 21.

The housing outer wall 22 has an outer surface including an engine attachment surface 25 to which the internal combustion engine 2 is attached, a pipe attachment surface 26 to which the pipe member 50 is attached, and a housing opening surface 27 to which the partition wall 60 is attached. The engine attachment surface 25 and the pipe attachment surface 26 are arranged substantially parallel to each other.

The housing outer wall 22 has an inner surface including a housing inner circumferential surface 28 and a housing inner bottom surface 29. The housing inner circumferential surface 28 defines a side part of the valve housing space 23. The housing inner bottom surface 29 is located in a first side in the axial direction DRa of the housing body 21 opposite to the second side and forms a bottom of the housing body 21. The housing inner bottom surface 29 includes a shaft supporter 291 configured to rotatably support the shaft 32. The housing inner bottom surface 29 includes a bottom surface protrusion 292 protruding toward the second side of the housing body 21 (i.e., inward the housing body 21) in the axial direction DRa.

The engine attachment surface 25 has a substantially flat shape and the internal combustion engine 2 is attached to the engine attachment surface 25. The engine attachment surface 25 defines an inlet port 251 through which the cooling water flows into the valve housing space 23. The inlet port 251 has a circular opening and the water jacket 503 is fluidly connected to the inlet port 251. In this embodiment, the inlet port 251 corresponds to an inlet opening.

The pipe attachment surface 26 has a substantially flat shape and the pipe member 50 is attached thereto. The pipe attachment surface 26 defines a first outlet port 261, a second outlet port 262, and a third outlet port 263. The cooling water having flown into the valve housing space 23 through the inlet port 251 flows out toward the pipe member 50 through the first outlet port 261, the second outlet port 262, and the third outlet port 263. Each of the first outlet port 261, the second outlet port 262, and the third outlet port 263 has a circular opening. In this embodiment, each of the first outlet port 261, the second outlet port 262, and the third outlet port 263 corresponds to an outlet opening.

The housing opening surface 27 has a substantially flat shape and the partition wall 60 is attached thereto. The housing opening surface 27 is arranged in the second side of the housing body 21 in the axial direction DRa. In addition, the housing opening surface 27 defines a housing opening 271 that fluidly connects the valve housing space 23 to the outside of the housing body 21. The housing opening 271 is closed by attaching the partition wall 60 to the housing opening surface 27.

The pipe member 50 is a pipe through which the cooling water having flown into the valve housing space 23 flows respectively to the air-conditioning heat exchanger 3, the oil cooler 4, and the radiator 5. The pipe member 50 includes a first pipe 51, a second pipe 52, and a third pipe 53 each of which has a cylindrical shape. The pipe member 50 is constituted by connecting between the first pipe 51, the second pipe 52, and the third pipe 53 with a pipe connecting portion 54.

The pipe connecting portion 54 connects between the first pipe 51, the second pipe 52, and the third pipe 53 and attaches the pipe member 50 to the pipe attachment surface 26. The pipe connecting portion 54 is in contact with and fixed to the pipe attachment surface 26. A gasket 55 is arranged between the pipe connecting portion 54 and the pipe attachment surface 26 to restrict the cooling water from leaking to the outside of the valve device 10.

The first pipe 51 has an upstream end, in a flow direction of the cooling water, located inside of the first outlet port 261 and a downstream end, in the flow direction of the cooling water, connected to the radiator 5 through a hose (not shown). The second pipe 52 has an upstream end, in the flow direction of the cooling water, located inside of the second outlet port 262 and a downstream end, in the flow direction of the cooling water, connected to the air-conditioning heat exchanger 3 through a hose (not shown). The third pipe 53 has an upstream end, in the flow direction of the cooling water, located inside of the third outlet port 263 and a downstream end, in the flow direction of the cooling water, connected to the oil cooler 4 through a hose (not shown). In addition, a first seal unit 561, a second seal unit 562, and a third seal unit 563 are provided respectively between the first pipe 51 and the first outlet port 261, between the second pipe 52 and the second outlet port 262, and between the third pipe 53 and the third outlet port 263.

The first seal unit 561 guides the cooling water flowing out of the first outlet port 261 to the first pipe 51. The second seal unit 562 guides the cooling water flowing out of the second outlet port 262 to the second pipe 52. The third outlet port 263 guides the cooling water flowing out of the third outlet port 263 to the third pipe 53. Each of the first seal unit 561, the second seal unit 562, and the third seal unit 563 is formed into a cylindrical shape and the cooling water can flow therethrough. In addition, each of the first seal unit 561, the second seal unit 562, and the third seal unit 563 has an upstream end in the flow direction of the cooling water that is configured to be in communication with an opening defined in the outer circumferential portion of the valve 30. The first seal unit 561 includes a first valve seal 571 to close a gap between the outer circumferential portion of the valve 30 and the first seal unit 561. Similarly, the second seal unit 562 and the third seal unit 563 respectively include a second valve seal 572 and a third valve seal 573 to close gaps between the outer circumferential portion of the valve 30 and the second seal unit 562 and between the outer circumferential portion of the valve 30 and the third seal unit 563.

The first valve seal 571 to the third valve seal 573 restrict the cooling water from leaking between the outer circumferential portion of the valve 30 and the first seal unit 561 to the third seal unit 563. Each of the first valve seal 571 to the third valve seal 573 has an upstream surface in the flow direction of the cooling water that is in contact with the outer circumferential portion of the valve 30. Each of the first valve seal 571, the second valve seal 572, the third valve seal 573 is formed of, for example, a resin member into a substantially annular shape. The first valve seal 571, the second valve seal 572, and the third valve seal 573 respectively define a first seal opening 581, a second seal opening 582, and a third seal opening 583. The cooling water flows in the first valve seal 571 through the first seal opening 581, in the second valve seal 572 through the second seal opening 582, and in the third valve seal 573 through the third seal opening 583.

The partition wall 60 closes the housing opening 271 and holds the valve 30 housed in the valve housing space 23. The partition wall 60 has a disk shape having a thickness direction in the axial direction DRa and is fitted into the housing opening 271 from a second side of the housing opening 271 (i.e., an outside of the housing opening) toward a first side of the housing opening 271 (i.e., an inside of the housing opening) in the axial direction DRa. The partition wall 60 has an outer diameter that is substantially the same as the inner diameter of the housing opening 271. Thus, the partition wall 60 closes the housing opening 271 by contacting the outer circumferential portion of the partition wall 60 with the housing inner circumferential surface 28.

In addition, the partition wall 60 includes a partition wall attachment portion 61 that having a plate shape and located in a second end of the partition wall 60 in the axial direction DRa that is away from the housing body 21. The partition wall attachment portion 61 protrudes from the outer circumferential portion of the partition wall 60 radially outward. The partition wall attachment portion 61 has a plate thickness direction in the axial direction DRa. The partition wall attachment portion 61 has a surface facing a first side in the axial direction DRa which is in contact with and fixed to the housing opening surface 27.

The partition wall 60 defines a shaft insertion hole 62 passing through the partition wall 60 in the axial direction DRa. The shaft 32 is inserted into the shaft insertion hole 62. The shaft insertion hole 62 is arranged such that the shaft insertion hole 62 is coaxial with the axis Axs when the shaft 32 is inserted into the shaft insertion hole 62. The shaft insertion hole 62 is provided with a bearing 63 to hold the shaft 32 inserted into the shaft insertion hole 62 and a shaft seal member 65 to restrict the cooling water from flowing into the shaft insertion hole 62.

The bearing 63 is constituted by, for example, a ball bearing, and rotatably supports the shaft 32 that is inserted into the shaft insertion hole 62. The bearing 63 is located on a second side of the shaft insertion hole 62 in the axial direction DRa that is away from the housing body 21. The shaft insertion hole 62 is also provided with a metal ring 64. The metal ring 64 is disposed at an outer circumferential portion of the bearing 63 to support the bearing 63. The metal ring 64 is formed of, for example, a metal into a substantial annular shape and the bearing 63 can be press-fitted into the metal ring 64.

The shaft seal member 65 is made of, for example, a resin member into a substantial annular shape. The shaft seal member 65 has an inner diameter that is substantially same as an outer diameter of the shaft 32 such that the shaft seal member 65 is in contact with an outer circumferential portion of the shaft 32 when the shaft 32 is inserted into the shaft insertion hole 62.

The partition wall 60 defines a partition wall through hole 66 through which the cooling water having flown into the shaft insertion hole 62 flows out of the shaft insertion hole 62. The partition wall through hole 66 passes through the partition wall 60 in the radial direction DRr and extends radially outward from the shaft insertion hole 62 to the outer circumferential portion of the partition wall 60. The partition wall through hole 66 also passes through the housing body 21 and is fluidly in communication with a housing through hole (not shown).

The partition wall 60 has an opening-closing surface 67 that forms a first surface of the partition wall 60 facing the valve housing space 23 in the axial direction DRa. The opening-closing surface 67 defines the valve housing space 23 together with the housing inner circumferential surface 28 and the housing inner bottom surface 29 when the partition wall 60 closes the housing opening 271. The opening-closing surface 67 is located on a side of the valve housing space 23 opposite to the housing inner bottom surface 29 in the axial direction Axs. The opening-closing surface 67 defines the shaft insertion hole 62 in a substantial center of the opening-closing surface 67.

The opening-closing surface 67 has an inner recess 611 and an outer recess 612 that are recessed from the opening-closing surface 67. The inner recess 611 and the outer recess 612 are located around the shaft insertion hole 62 entirely in a circumferential direction of the axis AXs. The valve 30 has a third valve outer surface 352. The inner recess 611 is located radially inward of the third valve outer surface 352. The outer recess 612 is located radially outward of the inner recess 611 and faces the third valve outer surface 352. The opening-closing surface 67 includes a connecting supporter 616 that supports both the valve 30 and the shaft 32.

The partition wall 60 has a closing surface protrusion 613 between the inner recess 611 and the outer recess 612. The closing surface protrusion 613 protrudes toward a first side of the valve 30 in the axial direction DRa (i.e., inward the valve device 10) and separates the inner recess 611 from the outer recess 612 in the radial direction DRr.

A housing seal member 68 having a substantially ring shape is arranged between the outer circumferential portion of the partition wall 60 and the housing inner circumferential surface 28. The housing seal member 68 closes a gap between the outer circumferential portion of the partition wall 60 and the housing inner circumferential surface 28 and adjusts a position of the shaft 32 inserted into the shaft insertion hole 62.

The housing seal member 68 has an outer diameter slightly smaller than the inner diameter of the housing opening 271 and slightly larger than the outer diameter of the partition wall 60. Therefore, the housing seal member 68 is compressed in the radial direction DRr when the partition wall 60 is fit into the housing opening 271. The housing seal member 68 presses the partition wall 60 with a stress generated when the housing seal member 68 is compressed in the radial direction DRr and positions the partition wall 60 at substantially the center of the housing opening 271 in the radial direction DRr. That is, the housing seal member 68 sets the position of the shaft 32 in the radial direction DRr to be substantially the center of the housing opening 271 when the shaft 32 is inserted into the shaft insertion hole 62.

The partition wall attachment portion 61 has a second surface facing away from the housing opening surface 27 in the axial direction DRa. The driving unit cover 80 is attached to the second surface of the partition wall attachment portion 61.

The driving unit cover 80 houses the driving unit 70. The driving unit cover 80 has a hollow shape made of a resin member and defines therein a driving unit space 81 in which the driving unit 70 is housed.

The driving unit cover 80 has a connector 82 for being connected to an ECU (not shown). The connector 82 connects the valve device 10 to the ECU and a terminal 83 is inserted into the connector 82. The driving unit 70 and a rotation angle sensor 73 which will be described later are connected to the terminal 83.

The driving unit 70 includes a motor 71 that transmits a rotational force for rotating the valve 30, a gear unit 72 that further transmits the output of the motor 71 to the valve 30, and the rotation angle sensor 73 that detects a rotation angle of the gear unit 72.

Figure 3:
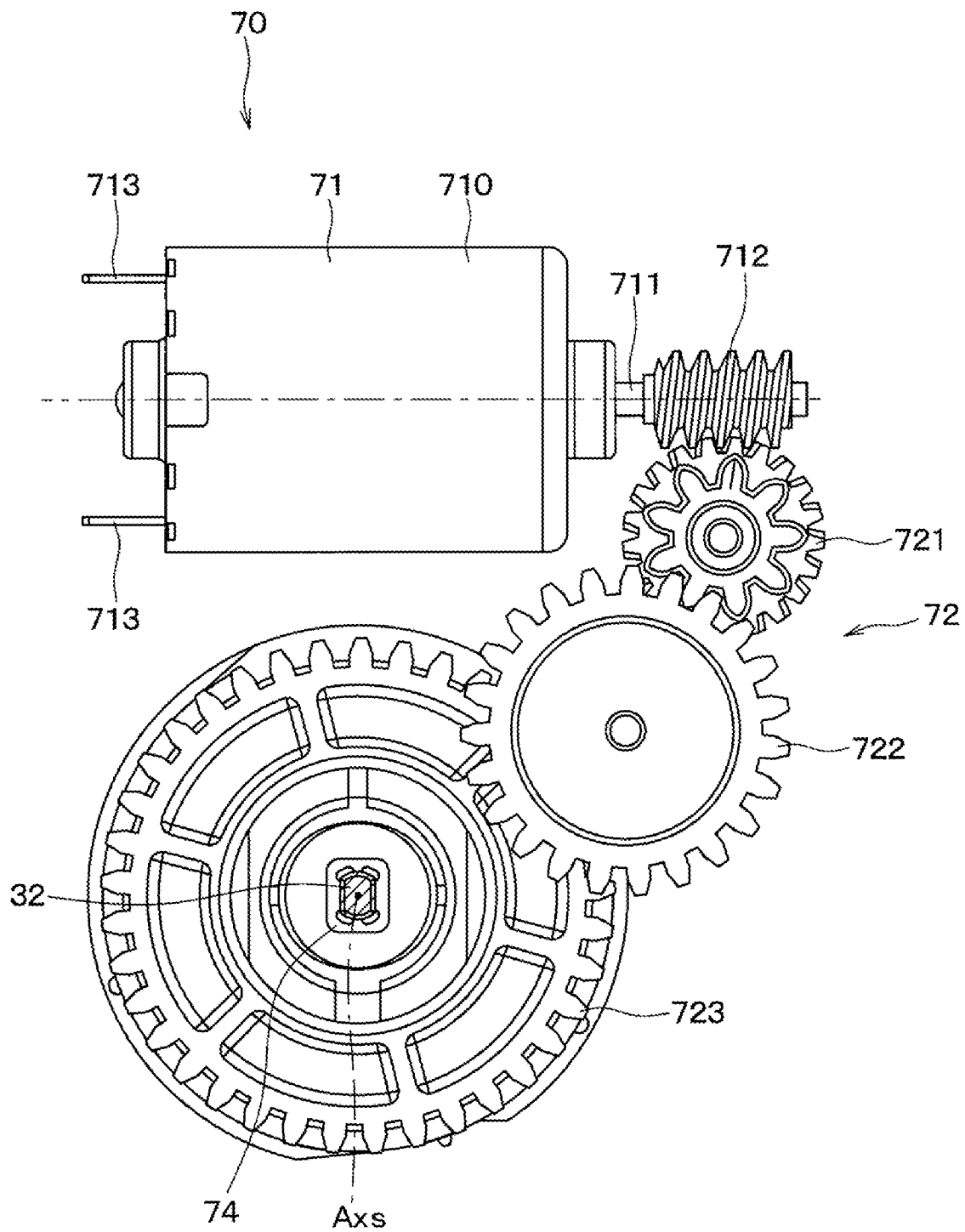
FIG. 3 is a schematic view of a driving unit in the first embodiment.

As shown in FIG. 3, the motor 71 has a motor body 710, a motor shaft 711, a worm gear 712, and a motor-side terminal 713. The motor body 710 transmits a driving force when an electricity is supplied to the motor-side terminal 713. The motor body 710 is formed into a substantially cylindrical shape and the motor shaft 711 protrudes from a second end of the motor body 710 that is away from the motor-side terminal 713. The driving force transmitted from the motor body 710 is transmitted to the gear unit 72 via the motor shaft 711 and the worm gear 712.

The gear unit 72 is composed of a reduction mechanism having multiple gears made of a resin and configured to transmit the driving force transmitted from the worm gear 712 to the shaft 32. Specifically, the gear unit 72 includes a first gear 721, a second gear 722 configured to mesh with the first gear 721, and a third gear 723 configured to mesh with the second gear 722. The shaft 32 is connected to the third gear 723. In the gear unit 72, the second gear 722 has an outer diameter larger than the outer diameter of the first gear 721 and the third gear 723 has an outer diameter larger than the outer diameter of the second gear 722.

Further, the first gear 721 to the third gear 723 are arranged such that their respective axes are orthogonal to an axis of the worm gear 712. The third gear 723 is arranged so that the third gear 723 is coaxial with the axis Axs. The shaft 32 is connected to the third gear 723.

The driving unit 70 is configured such that the worm gear 712, the first gear 721 to the third gear 723, and the valve 30 rotate altogether and the respective rotations have correlations with each other. That is, rotation angles of the worm gear 712, the first gear 721 to the third gear 723, and the shaft 32 have correlations with each other, so that one of the rotation angles of the gears having correlations can be calculated from a rotational angle of another one of the gears.

In the present embodiment, the rotation angle sensor 73 configured to detect a rotation angle of the third gear 723 is attached to a portion of the inner circumferential portion of the driving unit cover 80 facing the third gear 723. The rotation angle sensor 73 is a hall effect sensor incorporating a hall element. The rotation angle sensor 73 is configured to detect the rotation angle of the third gear 723 in a non-contact manner. The rotation angle sensor 73 is connected to an ECU (not shown) via the connector 82 and configured to transmit the detected rotation angle of the third gear 723 to the ECU. The ECU is configured to calculate the rotation angle of the valve 30 based on the rotation angle of the third gear 723 transmitted from the rotation angle sensor 73.

In order to detect the rotation angle of the third gear 723, the rotation angle sensor 73 may be a non-contact type angle sensor such as a magnetoresistive (MR) sensor and an inductive sensor or a contact type angle sensor such as a potentiometric sensor other than the hall effect sensor. The rotation angle sensor 73 may be configured to detect the rotation angle of any one of the worm gear 712, the first gear 721, and the second gear 722.

Next, the shaft 32 and the valve 30 will be described with reference to FIGS. 2 and 4 to 10. The shaft 32 is rotatable about the axis Axs by the rotational force transmitted from the driving unit 70. As shown in FIG. 2, the shaft 32 is connected to the valve 30 and the valve 30 can be rotated together with the shaft 32 when the shaft 32 rotates.

Figure 4:
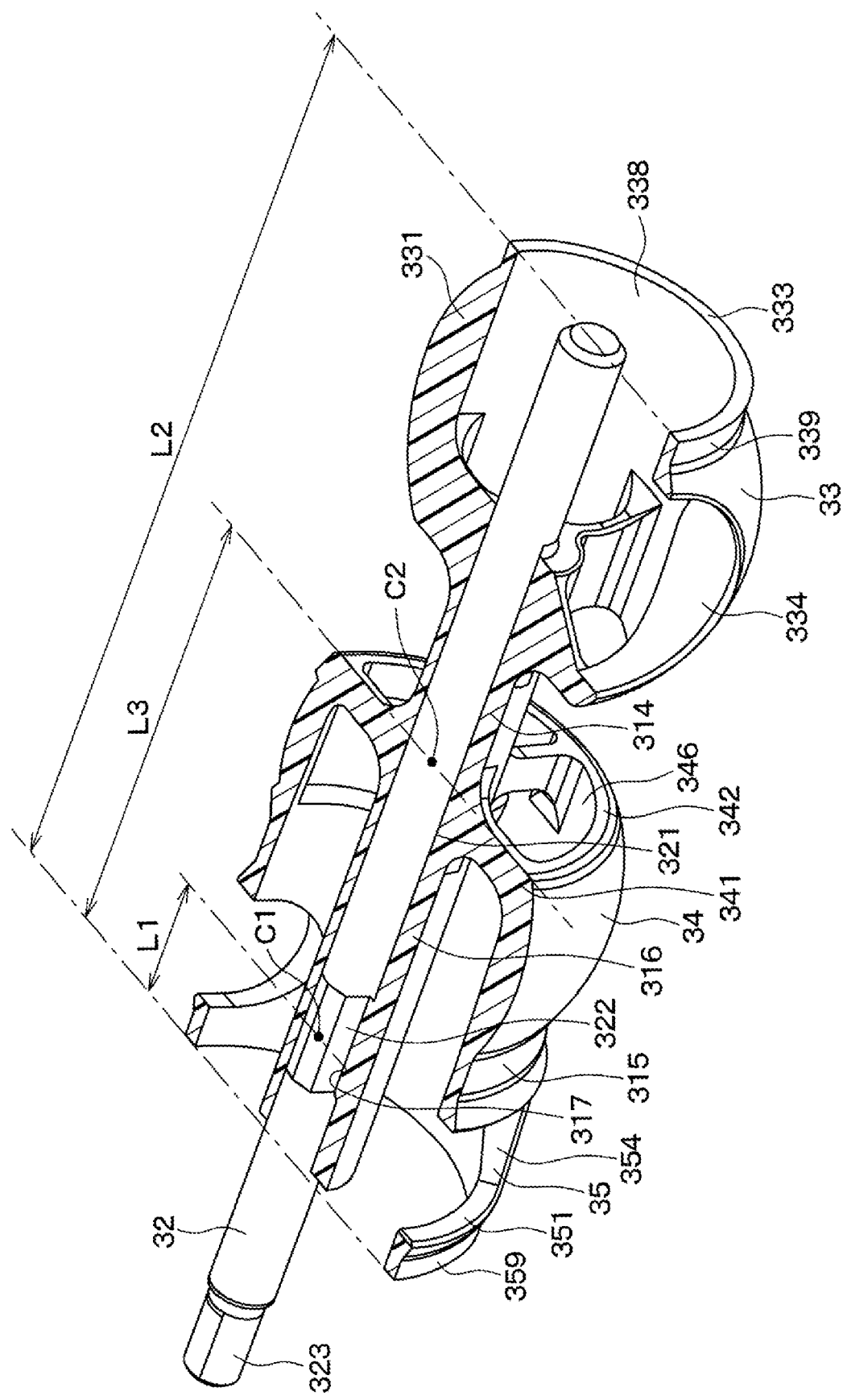
FIG. 4 is a partial cross-sectional view of a valve in the first embodiment.

The shaft 32 extends into a cylindrical pillar shape along the axis Axs and passes through the valve 30 in the axial direction DRa. As shown in FIG. 4, the shaft 32 includes a shaft outer circumferential portion 321 that forms an outer circumferential portion of the shaft 32 and a shaft flat portion 322 that is formed into a flat shape on the shaft outer circumferential portion 321.

The shaft flat portion 322 constitutes a linear portion of the shaft outer circumferential portion 321 in a radial cross section. The shaft flat portion 322 is formed such that the linear portion in the radial cross section extends along the axial direction DRa.

In the present embodiment, the shaft 32 has a hexagonal shape in the radial cross section. The shaft flat portion 322 is formed such that one side forming the hexagonal shape extends along the axial direction DRa.

The shaft flat portion 322 overlaps with a third valve 35 which will be described later in the radial direction DRr. Further, the shaft flat portion 322 has a size in the axial direction DRa smaller than a size of the third valve 35 in the axial direction DRa. A position of the shaft flat portion 322 will be described later.

The radial cross-sectional shape of the shaft flat portion 322 is not limited to the hexagonal shape, and may be appropriately changed to a shape such as a quadrangle or an octagon. The size of the shaft flat portion 322 in the axial direction DRa is not necessarily smaller than the size of the third valve 35 in the axial direction DRa and may be larger than the size of the third valve 35 in the axial direction DRa.

With reference to FIG. 2, the shaft 32 has a first end, in the axial direction DRa, connected to the shaft supporter 291 and a second end connected to the gear unit 72. The second end of the shaft 32 is located in one side of the axial direction DRa. The valve 30 is fixed to the shaft outer circumferential portion 321. In the present embodiment, the second end of the shaft 32 corresponds to a shaft end portion.

The valve 30 is configured to adjust the amount of the cooling water flowing out of the valve 30 by rotating around the axis Axs. The shaft 32 is inserted into the valve 30 and the shaft 32 and the valve 30 are housed in the valve housing space 23 such that the valve 30 and the shaft 32 are rotatable together.

The valve 30 has a tubular shape having an axis extending along the axial direction DRa and extends in the axial direction DRa. Specifically, the valve 30 is formed such that a first valve 33, a second valve 34, the third valve 35, a tubular connecting portion 314, and a tubular valve connecting portion 315 are connected to each other. In the valve 30, the first valve 33, the tubular connecting portion 314, the second valve 34, the tubular valve connecting portion 315, and the third valve 35 are arranged in this order from the first side to the second side of the axial direction DRa (i.e., from the first end to the second end of the shaft 32). The first valve 33 and the second valve 34 are connected to each other with the tubular connecting portion 314. The second valve 34 and the third valve 35 are connected to each other with the tubular valve connecting portion 315.

The second valve 34 and the tubular connecting portion 314 of the valve 30 face the inlet port 251 in the radial direction DRr in the valve housing space 23.

The valve 30 has a shaft connecting portion 316 that has a cylindrical hollow shape at a center of the valve 30. The shaft 32 is inserted into the shaft connecting portion 316. The shaft 32 is connected to the valve 30 by being inserted into the shaft connecting portion 316.

The valve 30 is formed, for example, such that the first valve 33, the second valve 34, the third valve 35, the tubular connecting portion 314, the tubular valve connecting portion 315, and the shaft connecting portion 316 are integrally formed by injection molding.

The valve 30 is a valve body to allow the cooling water having flown into the valve 30 to flow out to the first outlet port 261, the second outlet port 262, and the third outlet port 263. The first valve 33 is configured to selectively open and close the first outlet port 261, the second valve 34 is configured to selectively open and close the second outlet port 262, and the third valve 35 is configured to selectively open and close the third outlet port 263 by rotating the valve 30.

The first valve 33 to the third valve 35 are arranged such that their respective axes are coaxial with the axis Axs. Further, in each of the first valve 33 to the third valve 35, a central portion in the axial direction DRa expands radially outward compared to both ends of the each of the first valve 33 to the third valve 35 in the axial direction DRa. Each of the first valve 33 to the third valve 35 is configured such that the cooling water can flow therein.

Figure 5:
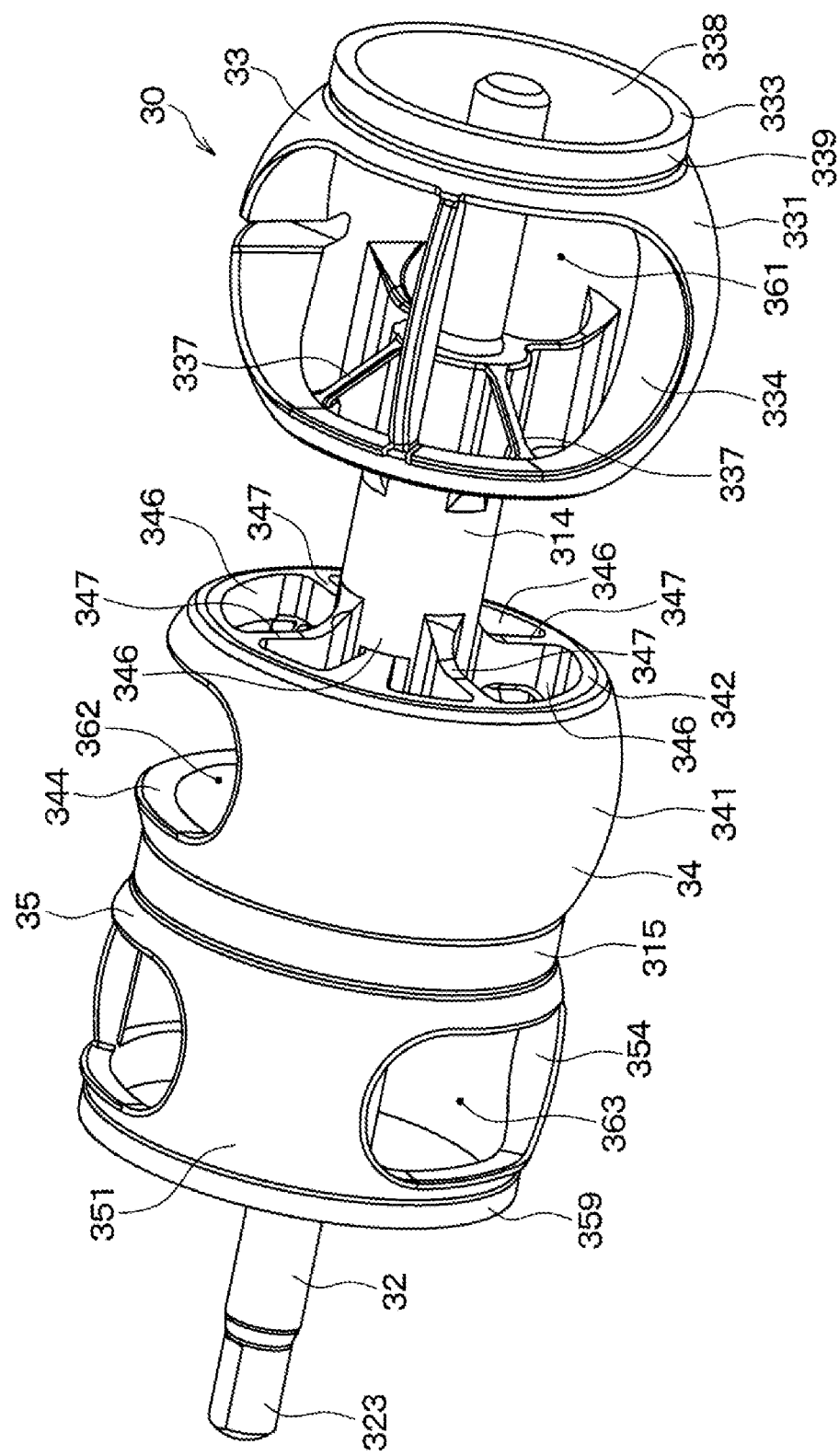
FIG. 5 is a perspective view of a first valve end surface of the valve in the first embodiment.
Figure 6:
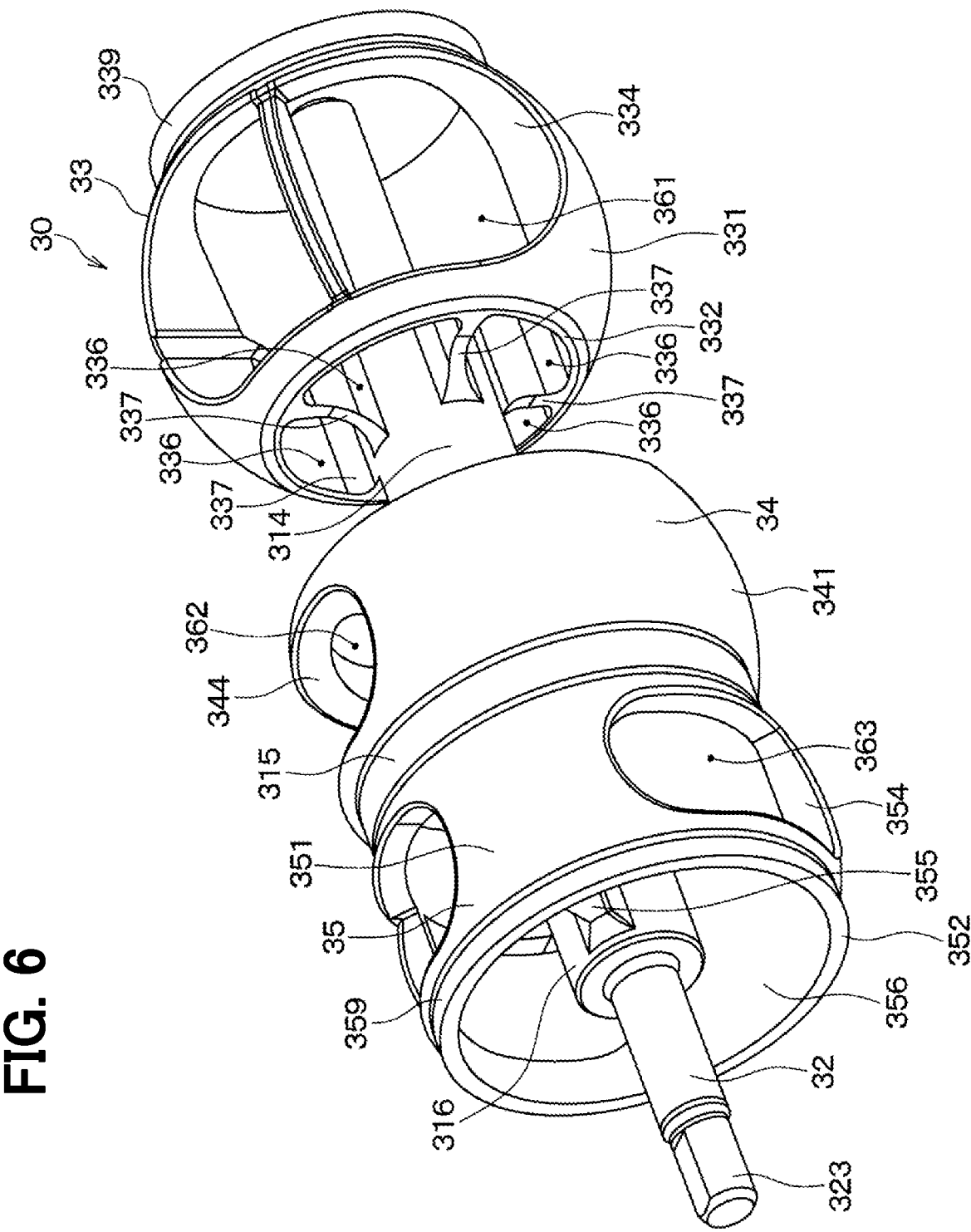
FIG. 6 is a perspective view of a second valve end surface of the valve in the first embodiment.

As shown in FIGS. 5 and 6, the first valve 33 has a first valve outer circumferential portion 331 that forms an outer circumferential portion of the first valve 33 and defines a first passage 361 inside the first valve outer circumferential portion 331. In addition, the first valve 33 includes a first valve inner surface 332 that faces in the axial direction Axs and defines first inner openings 336 through which the cooling water flows into the first passage 361. The first valve 33 also includes a first valve outer surface 333 opposite to the first valve inner surface 332 in the axial direction DRa. In the first valve 33, the cooling water having flown into the valve housing space 23 further flows into the first passage 361 through the first inner openings 336. In the present embodiment, the first passage 361 corresponds to a passage.

As shown in FIGS. 2 and 5, the first valve outer circumferential portion 331 defines a first outer circumferential opening 334 that fluidly connects the first passage 361 to the first outlet port 261 through the first seal opening 581 when the shaft 32 rotates. The first valve 33 allows the cooling water having flown into the first passage 361 to flow out to the radiator 5 through the first outlet port 261 by fluidly connecting the first outer circumferential opening 334 to the first outlet port 261. In the present embodiment, the first outer circumferential opening 334 formed in the first valve outer circumferential portion 331 corresponds to an outer circumferential opening formed in a valve outer circumferential portion.

The first outer circumferential opening 334 is formed in the first valve outer circumferential portion 331 and extends along the circumferential direction of the axis Axs. The amount of the cooling water flowing from the first valve 33 to the radiator 5 is adjusted according to an overlapping area between the first outer circumferential opening 334 and the first seal opening 581 by rotating the shaft 32.

The first valve outer circumferential portion 331 has a first valve extending portion 339 between the first outer circumferential opening 334 and the first valve outer surface 333 in the axial direction DRa. The first valve extending portion 339 has a cylindrical hollow shape extending along the axis Axs and is formed on a first side of the first valve outer circumferential portion 331 in the axial direction DRa that is away from the second valve 34. The first valve extending portion 339 extends toward the housing inner bottom surface 29.

In addition, the first valve extending portion 339 has the first valve outer surface 333 arranged at a first end of the first valve extending portion 339 in the axial direction DRa that is away from the first outer circumferential opening 34. The first valve extending portion 339 has a size in the axial direction DRa smaller than a size of the first outer circumferential opening 334 in the axial direction DRa. In the present embodiment, the first valve extending portion 339 corresponds to a valve extending portion.

The first valve inner surface 332 is arranged in a surface of the first valve 33 closer to the inlet port 251 of both surfaces of the first valve 33 facing in the axial direction DRa. The first valve outer surface 333 is arranged in a surface of the first valve 33 farther from the inlet port 251 of the both surfaces facing in the axial direction DRa.

As shown in FIG. 6, the shaft 32 is covered with the tubular connecting portion 314 and passes through the first valve inner surface 332 at a substantial center of the first valve inner surface 332. The first valve inner surface 332 is connected to the tubular connecting portion 314 with multiple first spoke portions 337.

The multiple first spoke portions 337 extend from the tubular connecting portion 314 in the redial direction DRr. In addition, the multiple first spoke portions 337 define the first inner openings 336 between adjacent ones of the first spoke portions 337. The first inner openings 336 serve as communication passages that fluidly connect the outside of the first valve 33 to the first passage 361.

The first valve outer surface 333 faces the housing inner bottom surface 29. As shown in FIG. 5, the first valve outer surface 333 defines a first outer opening 338 that opens into a circular shape. The first valve 33 is arranged so that the first valve outer surface 333 is not in contact with the housing inner bottom surface 29.

In the present embodiment, the first valve outer surface 333 corresponds to a valve end surface arranged at the first end of the valve 30 in the axial direction DRa. The first outer opening 338 corresponds to an end opening formed at the first end of the valve 30 in the axial direction DRa.

In the present embodiment, the housing inner bottom surface 29 corresponds to a housing inner surface arranged at a position of the housing 20 facing the first valve outer surface 333. In the present embodiment, the valve 30 is housed in the valve housing space 23 such that a gap S1 having a predetermined space is defined between the first valve outer surface 333 and the housing inner bottom surface 29. The housing inner bottom surface 29 has the bottom surface protrusion 292 that restricts the cooling water from flowing through the gap S1.

Figure 7:
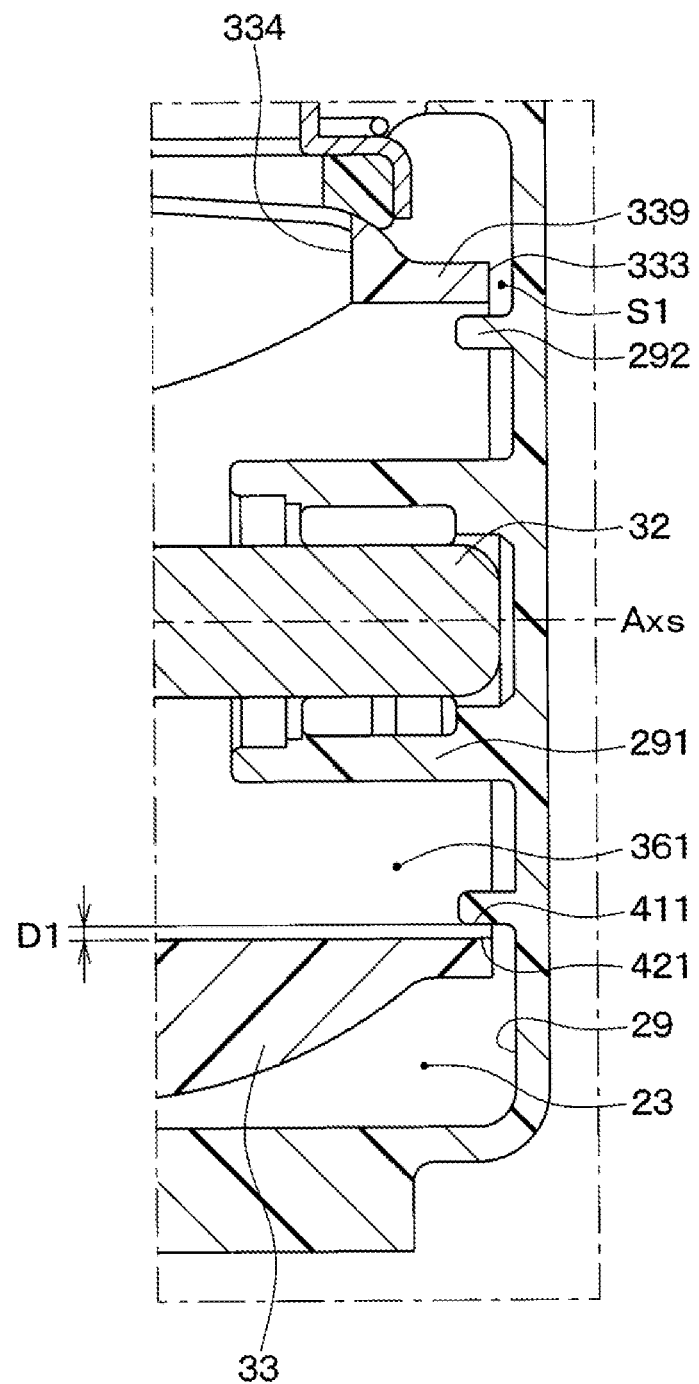
FIG. 7 is an enlarged view of a part VII in FIG. 2.

The bottom surface protrusion 292 annularly protrudes along the axial direction DRa. Specifically, as shown in FIG. 7, the bottom surface protrusion 292 protrudes from the housing inner bottom surface 29 toward the first valve 33 and extends into the first valve 33. The bottom surface protrusion 292 overlaps with the first valve extending portion 339 in the radial direction DRr. The bottom surface protrusion 292 includes a tip end at an outer circumferential portion of the bottom surface protrusion 292. The first valve extending portion 339 includes a tip end at an inner circumferential portion of the first valve extending portion 339. The tip end of the bottom surface protrusion 292 faces the tip end of the first valve extending portion 339 in the radial direction DRr. In the present embodiment, the bottom surface protrusion 292 corresponds to a protrusion.

The bottom surface protrusion 292 has a first fluid resistance surface 411 facing the inner circumferential portion of the first valve extending portion 339 in the radial direction DRr. In addition, the first valve extending portion 339 has a first resistance facing surface 421 that faces the first fluid resistance surface 411 in the radial direction DRr. In the present embodiment, the first fluid resistance surface 411 corresponds to a fluid resistance surface. The first resistance facing surface 421 corresponds to a resistance surface.

The bottom surface protrusion 292 formed as described above defines a passage between the bottom surface protrusion 292 and the first valve 33. The passage is in fluid communication with the gap S1. The passage in fluid communication with the gap S1 and the gap S1 constitutes a labyrinth structure. The labyrinth structure is formed such that a flow direction of the cooling water is changed when the cooling water flows through the labyrinth structure. The labyrinth structure is formed by having a portion where the bottom surface protrusion 292 and the first valve extending portion 339 overlap with each other in the radial direction DRr.

The labyrinth structure, for example, causes the cooling water having flown out of the first outer opening 338 to reflect at the housing inner bottom surface 29 when the cooling water flows out of the first valve 33 through the first outer opening 338. Thus, the flow direction of the cooling water is changed. The labyrinth structure, for example, causes the cooling water flowing out of the gap S1 to reflect at the bottom surface protrusion 292 when the cooling water flows into the first passage 361 through the gap S1 and the flow direction of the cooling water is changed.

It is preferable that the bottom surface protrusion 292 be formed as large in the axial direction DRa as possible within a range where the bottom surface protrusion 292 does not overlap with the first outer circumferential opening 334 in the radial direction DRr. In the present embodiment, the bottom surface protrusion 292 has a size such that the bottom surface protrusion 292 does not overlap with the first outer circumferential opening 334 in the radial direction DRr. The size of the bottom surface protrusion 292 in the axial direction DRa is substantially the same as the size of the first valve extending portion 339 in the axial direction DRa.

In addition, the bottom surface protrusion 292 is located radially outward of both the shaft 32 and the shaft supporter 291. In addition, the bottom surface protrusion 292 is located radially inward of the first valve outer surface 333. Specifically, the bottom surface protrusion 292 is located such that a gap D1, in the radial direction DRr, between the first resistance facing surface 421 and the first fluid resistance surface 411 is smaller than a gap, in the radial direction DRr, between the shaft 32 and the first fluid resistance surface 411. The bottom surface protrusion 292 is arranged such that the gap D1 is smaller than a gap, in the radial direction DRr, between the shaft supporter 291 and the first fluid resistance surface 411. The bottom surface protrusion 292 is arranged such that the gap D1 is smaller than a gap, in the axial direction DRa, between the first valve outer surface 333 and the housing inner bottom surface 29 in the axial direction DRa. The bottom surface protrusion 292 may be located radially outward of the shaft 32 and radially inward of the shaft supporter 291.

The bottom surface protrusion 292 has a thickness in the radial direction DRr that is larger than the gap D1. The bottom surface protrusion 292 is formed such that the thickness in the radial direction DRr is substantially constant from a root side to a tip side of the bottom surface protrusion 292. The bottom surface protrusion 292 is formed such that each of an inner diameter and an outer diameter of the bottom surface protrusion 292 is substantially constant from the root side to the tip side. Further, the bottom surface protrusion 292 is arranged such that the gap D1 is substantially constant in the axial direction DRa.

It is preferable that the bottom surface protrusion 292 be located such that the gap D1 is as small as possible. In the present embodiment, the bottom surface protrusion 292 is arranged such that the gap D1 is equal to or less than a half of a gap between the first valve outer surface 333 and the housing inner bottom surface 29 in the axial direction DRa.

Further, it is preferable that the bottom surface protrusion 292 is located such that a ratio of the gap D1 to a distance, in the radial direction DRr, between the axis Axs and the first resistance facing surface 421 is equal to or less than 0.15. For example, in the present embodiment, the first valve 33 is formed such that the gap, in the radial direction DRr, between the axis Axs and the first resistance facing surface 421 is approximately 20 mm. In contrast, the bottom surface protrusion 292 is arranged such that the ratio of the gap D1 to the gap in the radial direction DRr between the axis Axs and the first resistance facing surface 421 is about 0.1. Specifically, the bottom surface protrusion 292 is arranged such that the gap D1 is about 2 mm.

When the cooling water flows through the passage between the bottom surface protrusion 292 and the first valve 33, a boundary layer of the fluid is generated near the first resistance facing surface 421 and the first fluid resistance surface 411. The boundary layer of the fluid restricts the cooling water from flowing through the boundary layer.

The boundary layer of the fluid refers to a region where the velocity of the fluid becomes slow due to an action of the viscosity when the fluid having viscosity flows near a surface of an object. The velocity of the fluid flowing through the boundary layer of the fluid becomes slower in a direction closer to the surface of the object and becomes faster in a direction away from the surface of the object.

In the present embodiment, when the cooling water flows through the passage between the bottom surface protrusion 292 and the first valve 33, the boundary layers are generated in a vicinity of both the first resistance facing surface 421 and the first fluid resistance surface 411. Therefore, among the cooling water flowing through the passage between the bottom surface protrusion 292 and the first valve 33, the cooling water flowing in the vicinity of the first resistance facing surface 421 is restricted from flowing by the boundary layer of the fluid generated near the first resistance facing surface 421. Further, among the cooling water flowing in the passage between the bottom surface protrusion 292 and the first valve 33, the cooling water flowing in the vicinity of the first fluid resistance surface 411 is restricted from flowing by the boundary layer of the fluid generated near the first fluid resistance surface 411.

When the gap D1 is smaller than the predetermined value, the cooling water flowing through the passage between the bottom surface protrusion 292 and the first valve 33 flows in the vicinity of both the first resistance facing surface 421 and the first fluid resistance surface 411. In this case, a part of the cooling water flowing through the passage between the bottom surface protrusion 292 and the first valve 33 is restricted from flowing by the two boundary layers of the fluid generated near the first resistance facing surface 421 and the first fluid resistance surface 411.

That is, when the gap D1 is smaller than the predetermined value, the boundary layer of the fluid generated near the first resistance facing surface 421 and the boundary layer of the fluid generated near the first fluid resistance surface 411 overlap with each other. It is preferable that the bottom surface protrusion 292 be arranged such that the gap D1 has an overlapping area between the boundary layer of the fluid generated near the first resistance facing surface 421 and the boundary layer of the fluid generated near the first fluid resistance surface 411.

In the present embodiment, it is preferable that the bottom surface protrusion 292 is arranged such that the gap D1 is equal to or less than about 2 mm. As a result, the bottom surface protrusion 292 is arranged such that a part of the boundary layer of the fluid generated near the first fluid resistance surface 411 is overlapped with a part of the boundary layer generated near the first resistance facing surface 421 in the passage between the bottom surface protrusion 292 and the first valve 33.

Next, the second valve 34 will be described. As shown in FIGS. 5 and 6, the second valve 34 has a second valve outer circumferential portion 341 forming an outer circumferential portion of the second valve 34. The second valve defines a second passage 362 inside the second valve outer circumferential portion 341. In addition, the second valve 34 has a second valve inner surface 342 that faces in the axial direction Axs and is located in a first end of the second valve 34 facing the first valve inner surface 332 of the first valve 33. The second valve inner surface 342 defines second inner openings 346 through which the cooling water flows into the second passage 362. The second valve 34 is configured such that the cooling water having flown into the valve housing space 23 through the inlet port 251 flows into the second passage 362 through the second inner openings 346. In the present embodiment, the second passage 362 corresponds to a flow passage As shown in FIGS. 2 and 5, the second valve outer circumferential portion 341 defines a second outer circumferential opening 344 that fluidly connects the second passage 362 to the second outlet port 262 through the second seal opening 582 when the shaft 32 rotates. The second valve 34 allows the cooling water having flown into the second passage 362 to flow into the air-conditioning heat exchanger 3 through the second outlet port 262 by fluidly connecting the second outer circumferential opening 344 to the second outlet port 262. In the present embodiment, the second outer circumferential opening 344 defined in the second valve outer circumferential portion 341 corresponds to an outer circumferential opening defined in the valve outer circumferential portion.

The second outer circumferential opening 344 extends in the circumferential direction of the axis Axs. The amount of the cooling water flowing out from the second valve 34 to the air-conditioning heat exchanger 3 is adjusted according to an overlapping area between the second outer circumferential opening 344 and the second seal opening 582 by rotating the shaft 32.

The second valve inner surface 342 is formed at the first end of the second valve outer circumferential portion 341 in the axial direction DRa. As shown in FIG. 5, the shaft 32 is covered with the tubular connecting portion 314 and the shaft 32 passes through the second valve inner surface 342 at a substantial center of the second valve inner surface 342. In addition, the second valve inner surface 342 is connected to the tubular connecting portion 314 with multiple second spoke portions 347.

The second spoke portions 347 extend from the tubular connecting portion 314 in the radial direction DRr. In addition, the second spoke portions 347 define the second inner openings 346 between adjacent ones of the second spoke portions 347. The second inner openings 346 serve as communication passages that fluidly connect the outside of the second valve 34 to the second passage 362.

The second valve inner surface 342 faces the first valve inner surface 332. The second inner openings 346 face the first inner openings 336. The second spoke portions 347 are connected to the first spoke portions 337 by the tubular connecting portion 314.

The tubular connecting portion 314 connects the first valve 33 to the second valve 34. An outer diameter of the tubular connecting portion 314 is smaller than the outer diameter of the first valve inner surface 332 and the outer diameter of the second valve inner surface 342.

As shown in FIG. 2, the tubular connecting portion 314 defines a first inter-valve space 37 between an outer circumferential portion of the tubular connecting portion 314 and the housing inner circumferential surface 28. The first passage 361 and the second passage 362 are in fluid communication with each other through the first inter-valve space 37.

The second valve 34 has the shaft connecting portion 316 to cover the outer circumferential portion of the shaft 32 at substantially the center of the second valve 34. The second valve outer circumferential portion 341 has a second end facing away from the first end of the second valve 34 in the axial direction DRa. The second end of the second valve outer circumferential portion 341 is connected to the tubular valve connecting portion 315. The second valve 34 is configured such that the cooling water having flown into the second passage 362 flows into the third valve 35 through the tubular valve connecting portion 315.

The tubular valve connecting portion 315 defines a second inter-valve space 38 therein. The second inter-valve space 38 is in communication with both the second passage 362 and a third passage 363. The tubular valve connecting portion 315 has a first end, in the axial direction DRa, having an outer diameter equal to an outer diameter of the second end of the second valve 34. The first end of the tubular valve connecting portion 315 faces the second end of the second valve 34. The tubular valve connecting portion 315 has a second end, in the axial direction DRa, having an outer diameter equal to an outer diameter of a first end of the third valve 35 in the axial direction DRa. The tubular valve connecting portion 315 is continuously connected to both the second valve outer circumferential portion 341 and a third valve outer circumferential portion 351.

Next, the third valve 35 will be described. As shown in FIGS. 5 and 6, the third valve 35 has the third valve outer circumferential portion 351 that forms an outer circumferential portion of the third valve 35. The third valve 35 defines the third passage 363 in the third valve outer circumferential portion 351. The third valve outer circumferential portion 351 of the third valve 35 has the first end, in the axial direction DRa, connected to the tubular valve connecting portion 315. The third valve 35 has a third valve outer surface 352 that faces in the axial direction and located in a second end of the third valve 35. The third valve outer surface 352 faces away from the tubular valve connecting portion 315. The third valve outer surface 352 defines a third outer opening 356. The cooling water having flown into the second passage 362 flows into the third passage 363 through the second inter-valve space 38. In the present embodiment, the third passage 363 corresponds to a passage.

In addition, as shown in FIGS. 2 and 5, the third valve outer circumferential portion 351 defines a third outer circumferential opening 354 that fluidly connects the third passage 363 to the third outlet port 263 through the third seal opening 583 by rotating the shaft 32. The third valve 35 allows the cooling water having flown into the third passage 363 to flow toward the oil cooler 4 through the third outlet port 263 by fluidly connecting the third outer circumferential opening 354 to the third outlet port 263. In the present embodiment, the third outer circumferential opening 354 defined by the third valve outer circumferential portion 351 corresponds to an outer circumferential opening defined in a valve outer circumferential portion.

The third outer circumferential opening 354 extends in the circumferential direction of the axis Axs in the third valve outer circumferential portion 351. The amount of the cooling water flowing out of the third valve 35 toward the oil cooler 4 is adjusted according to an overlapping area between the third outer circumferential opening 354 and the third seal opening 583 by rotating the shaft 32.

The third valve outer circumferential portion 351 has a third valve extending portion 359 between the third outer circumferential opening 354 and the third valve outer surface 352 in the axial direction DRa. The third valve extending portion 359 has a cylindrical hollow shape extending along the axis Axs and is located in the second end of the third valve outer circumferential portion 351 in the axial direction DRa. The third valve extending portion 359 extends toward the opening closing-surface 67.

The third valve extending portion 359 has a second end, in the axial direction DRa, at which the third valve outer surface 352 is arranged. The third valve extending portion 359 has a size in the axial direction DRa smaller than a size of the third outer circumferential opening 354 in the axial direction DRa. In the present embodiment, the third valve extending portion 359 corresponds to a valve extending portion.

The third valve outer surface 352 faces the opening-closing surface 67. As shown in FIG. 6, the third valve outer surface 352 defines the third outer opening 356 formed into a circular shape. The third valve 35 is arranged such that the third valve outer surface 352 is not in contact with the opening-closing surface 67. The shaft connecting portion 316 is arranged substantially in the center of the third valve 35.

Figure 8:
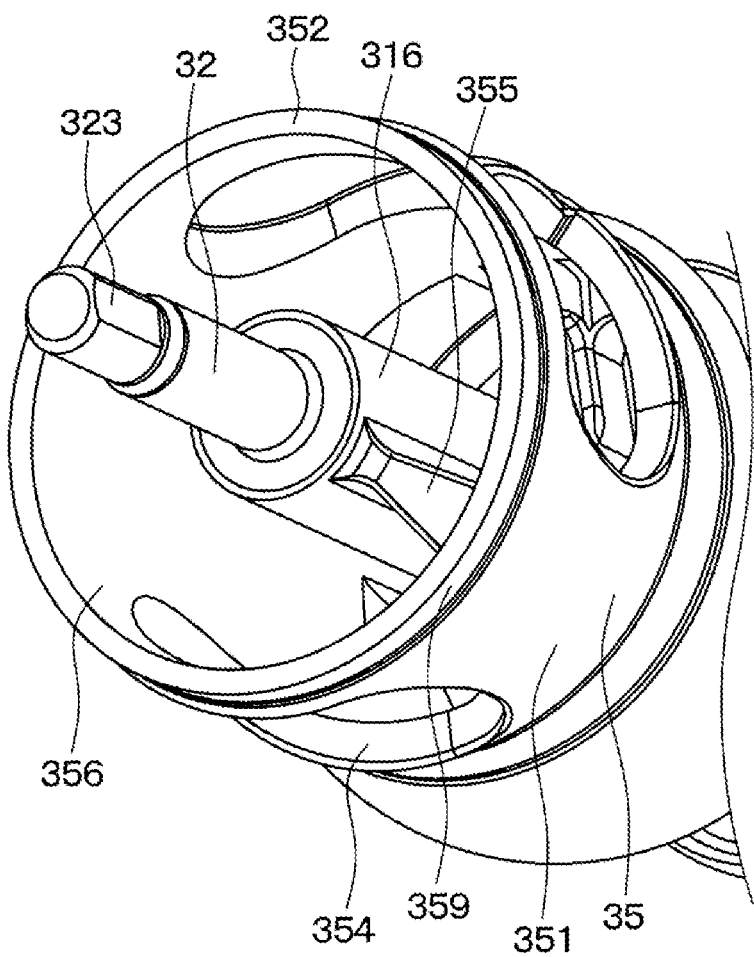
FIG. 8 is a schematic view illustrating a stopper of the valve in the first embodiment.
Figure 9:
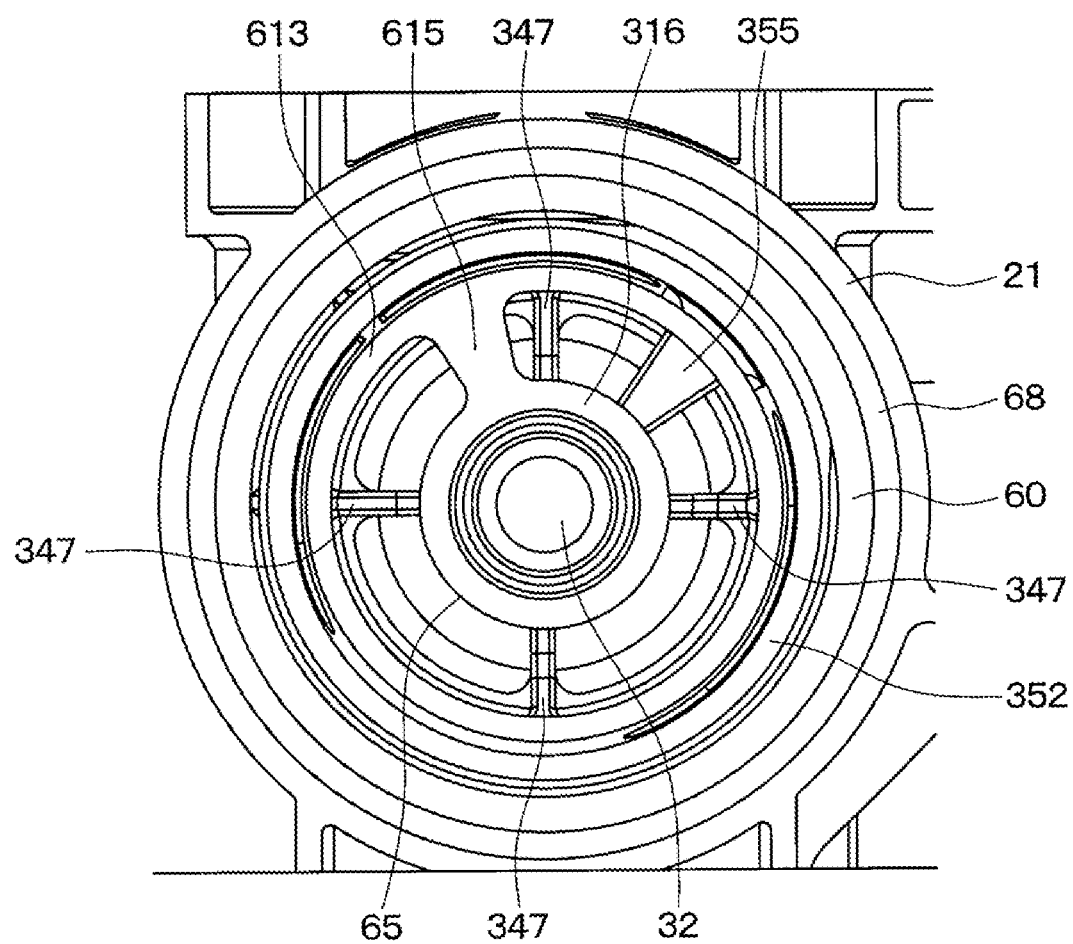
FIG. 9 is a cross-sectional view taken along a line IX-IX in FIG. 2.

Further, as shown in FIGS. 8 and 9, the third valve 35 has a valve-positioning portion 355 that restricts the valve 30 from rotating. The valve-positioning portion 355 restricts the valve 30 from rotating by engaging with a stopper 615 that will be described later.

The valve-positioning portion 355 has a rod shape. The valve-positioning portion 355 extends in the radial direction DRr from the tubular valve connecting portion 315 toward an inner circumferential surface of the third valve 35. Further, a size of the valve-positioning portion 355 in the circumferential direction increases in a direction from an inner side to an outer side of the valve-positioning portion 355 in the radial direction DRr.

The valve-positioning portion 355 is arranged on a portion of the inner circumferential surface of the third valve outer circumferential portion 351 outside of the third outer circumferential opening 354. The valve-positioning portion 355 is arranged at a position that does not overlap with both the first spoke portions 337 and the second spoke portions 347 in the axial direction DRa.

The shaft connecting portion 316 has a tubular shape and the shaft 32 is inserted into and fixed to the shaft connecting portion 316 to be connected to the valve 30. The shaft connecting portion 316 transmits the rotational force of the shaft 32 to the valve 30 when the shaft 32 rotates.

The shaft connecting portion 316 extends from the second valve 34 to the third valve 35 toward the second side of the valve 30 in the axial direction DRa. The shaft connecting portion 316 has a second end, in the axial direction DRa, supported by the connecting supporter 616 arranged on the opening-closing surface 67.

The shaft connecting portion 316 has an inner circumferential portion having a shape that matches a shape of the shaft outer circumferential portion 321. The inner circumferential portion of the shaft connecting portion 316 is in contact with the shaft outer circumferential portion 321. As shown in FIG. 4, the shaft connecting portion 316 has an inner diameter that is substantially the same as the outer diameter of a cylindrical portion of the shaft outer circumferential portion 321. The shaft connecting portion 316 has a connecting flat portion 317 that is in contact with the shaft flat portion 322. The connecting flat portion 317 has a flat shape.

Specifically, the connecting flat portion 317 of the inner circumferential portion of the shaft connecting portion 316 has a radial cross section having a hexagonal shape. The cross section of the connecting flat portion 317 corresponds to the radial cross section of the shaft flat portion 322 of the shaft outer circumferential portion 321.

The connecting flat portion 317 constitutes a portion of the inner circumferential portion of the shaft connecting portion 316 that has a liner shape in the radial cross section. The connecting flat portion 317 is formed such that the linear portion of the inner circumferential portion of the shaft connecting portion 316 extends along the axial direction DRa.

Further, the connection flat portion 317 is arranged to overlap with the shaft flat portion 322 in the radial direction DRr and is in contact with the shaft flat portion 322. Further, the connecting flat portion 317 overlaps with the valve-positioning portion 355 in the radial direction DRr.

In addition, the connecting flat portion 317 is located closer, in the axial direction DR, to the third valve outer surface 352 than a center C2 of the valve 30 in the axial direction DRa.

Specifically, an assembling distance L1 is defined between the third valve outer surface 352 and a center C1 of the connecting flat portion 317 in the axial direction DRa. The connecting flat portion 317 is arranged such that the assembling distance L1 is equal to or less than a half of a total length of the valve 30 between the third valve outer surface 352 and the first valve outer surface 333. That is, the assembling distance L1 is equal to or less than a valve center distance L3 between the third valve outer surface 352 and the center C2 of the valve 30 in the axial direction DRa.

It is preferable that the connecting flat portion 317 be arranged at a position as close to a connecting portion between the shaft 32 and the driving unit 70 as possible. In the present embodiment, the connecting flat portion 317 is formed such that the assembling distance L1 is equal to or less than half the valve center distance L3.

The third valve outer surface 352 corresponds to a valve end surface arranged at the second end of the valve 30 in the axial direction DRa. The third outer opening 356 defined at the third valve outer surface 352 corresponds to an end surface opening defined at the second end of the valve end surface in the axial direction DRa.

Further, in the present embodiment, the opening-closing surface 67 corresponds to a housing inner surface facing the third valve outer surface 352. In the present embodiment, the valve 30 is housed inside the valve housing space 23 such that a gap S2 having a predetermined space is defined between the third valve outer surface 352 and the opening-closing surface 67.

The opening-closing surface 67 includes a closing surface protrusion 613 that restricts the cooling water from flowing through the gap S2. In the present embodiment, the closing surface protrusion 613 corresponds to a protrusion.

Figure 10:
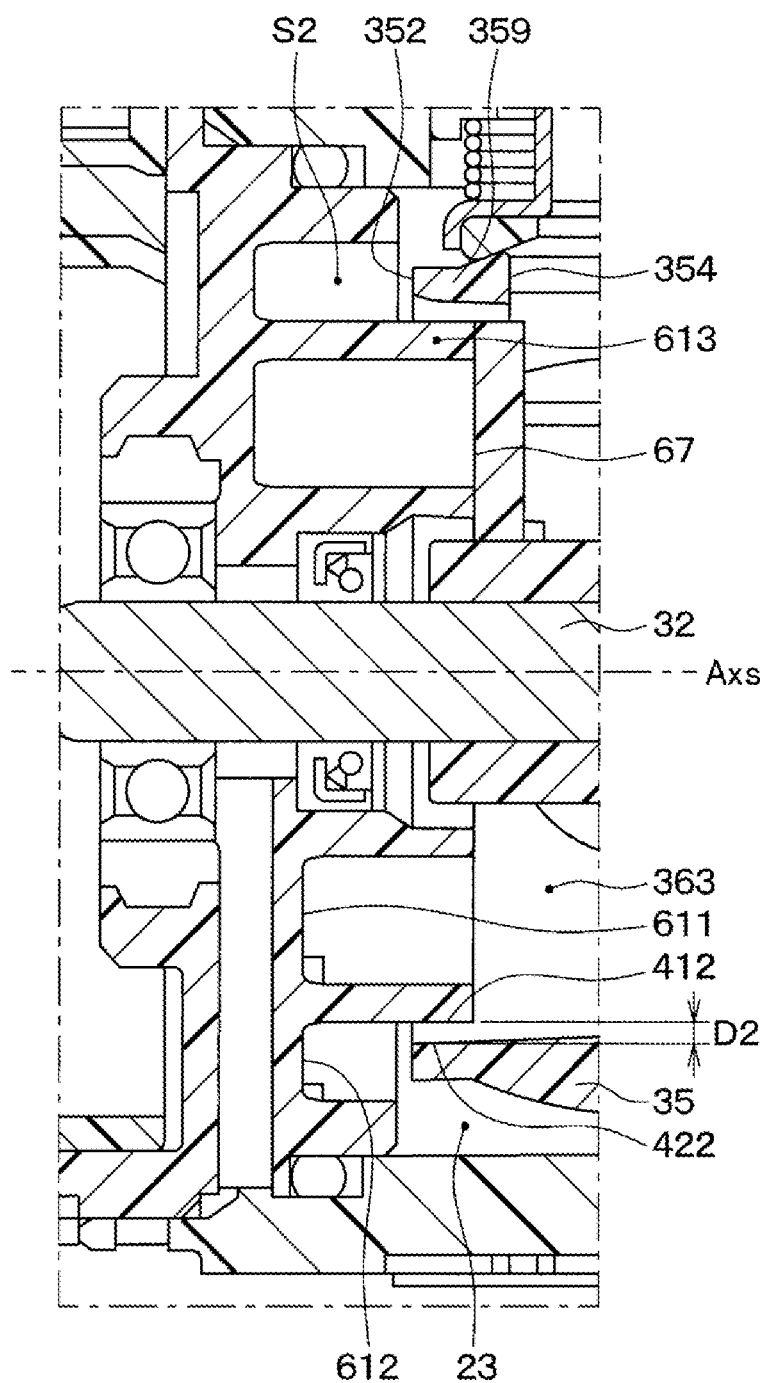
FIG. 10 is an enlarged view of a part X in FIG. 2.

The closing surface protrusion 613 annularly protrudes in the axial direction DRa. Specifically, as shown in FIG. 10, the closing surface protrusion 613 protrudes from the opening-closing surface 67 toward the third valve 35 and extends into the third valve 35. The closing surface protrusion 613 overlaps with the third valve extending portion 359 in the radial direction DRr. The closing surface protrusion 613 has a tip end at the outer circumferential portion of the closing surface protrusion 613. The third valve extending portion 359 has a tip end at the inner circumferential portion of the third valve extending portion 359. The tip end of the closing surface protrusion 613 faces the tip end of the third valve extending portion 359 in the radial direction DRr.

The closing surface protrusion 613 has a second fluid resistance surface 412 that faces the inner circumferential portion of the third valve extending portion 359 in the radial direction DRr. The third valve extending portion 359 has a second resistance facing surface 422 that faces the second fluid resistance surface 412 in the radial direction DRr. In the present embodiment, the second fluid resistance surface 412 corresponds to a fluid resistance surface. In the present embodiment, the second resistance facing surface 422 corresponds to a resistance surface.

The closing surface protrusion 613 formed as described above defines a passage between the closing surface protrusion 613 and the third valve 35. The passage is fluidly in communication with the gap S2. The gap S2 and the passage in communication with the gap S2 constitutes a labyrinth structure similarly to a combination of the gap S1 and the passage in communication with the gap S1.

The labyrinth structure is configured to change a flow direction of the cooling water by reflecting the cooling water having flown out of the third outer opening 356 at the opening-closing surface 67 when, for example, the cooling water flows out of the third valve 35 through the third outer opening 356. The labyrinth structure is configured to change a flow direction of the cooling water by reflecting the cooling water having flown out through the gap S2 at the closing surface protrusion 613 when, for example, the cooling water flows into the third passage 363 through the gap S2.

It is preferable that the closing surface protrusion 613 be formed as large in the axial direction DRa as possible within a range where the closing surface protrusion 613 does not overlap with the third outer circumferential opening 354 in the radial direction DRr. The closing surface protrusion 613 is formed into a size that does not overlap with the third outer circumferential opening 354 in the radial direction DRr. The closing surface protrusion 613 has a size, in the axial direction DRa, slightly larger than a size of the third valve extending portion 359 in the axial direction DRa.

The closing surface protrusion 613 is disposed radially outward of both the shaft 32 and the connecting supporter 616 and between the inner recess 611 and the outer recess 612. The closing surface protrusion 613 is also disposed in radially inward of the third valve outer surface 352. Specifically, the closing surface protrusion 613 is disposed such that a gap D2 between the second resistance facing surface 422 and the second fluid resistance surface 412 in the radial direction DRr is smaller than a gap between the shaft 32 and the second fluid resistance surface 412 in the radial direction DRr. The closing surface protrusion 613 is disposed such that the gap D2 is smaller than a gap between the connecting supporter 616 and the second fluid resistance surface 412 in the radial direction DRr. The closing surface protrusion 613 may be disposed radially outward of the shaft 32 and radially inward of the inner recess 611.

The gap D2 is smaller than a gap between the third valve outer surface 352 and the opening-closing surface 67 in the axial direction DRa. In the present embodiment, the third valve outer surface 352 faces the outer recess 612 in the axial direction DRa. Therefore, the closing surface protrusion 613 is disposed such that the gap D2 is smaller than a gap between the third valve outer surface 352 and the outer recess 612 in the axial direction DRa.

In addition, the closing surface protrusion 613 has a thickness in the radial direction DRr that is greater than the gap D2. The closing surface protrusion 613 is formed such that the thickness in the radial direction DRr is substantially constant from a root end to a tip end of the closing surface protrusion 613. Further, the inner diameter and the outer diameter of the closing surface protrusion 613 are formed to be substantially constant from the root end to the tip end in the axial direction DRa. In addition, the closing surface protrusion 613 is arranged such that the gap D2 is substantially constant in the axial direction DRa.

It is preferable that the closing surface protrusion 613 be disposed such that the gap D2 is as small as possible similarly to the gap D1 of the bottom surface protrusion 292. In the present embodiment, the closing surface protrusion 613 is formed such that the gap D2 is equal to or less than a gap between the third valve outer surface 352 and the outer recess 612 in the axial direction DRa.

A ratio of the gap D2 to the gap in the radial direction DRr between the axis Axs and the second resistance facing surface 422 is determined similarly to the ratio of the gap D1 to the gap in the radial direction DRr between the axis Axs and the first resistance facing surface 421. Therefore, the description for the ratio of the gap D2 to the gap between the axis Axs and the second resistance facing surface 422 in the radial direction DRr will be omitted.

When the cooling water flows through the passage between the closing surface protrusion 613 and the third valve 35, a boundary layer of the fluid to restrict the cooling water from flowing is generated near the second resistance facing surface 422 and the second fluid resistance surface 412, similarly to the first resistance facing surface 421 and the first fluid resistance surface 411. In the present embodiment, it is preferable that the closing surface protrusion 613 be arranged such that the gap D2 is equal to or less than about 2 mm, similarly to the gap D1. As a result, the closing surface protrusion 613 is arranged such that a part of the boundary layer of the fluid generated near the second fluid resistance surface 412 overlaps with a part of the boundary layer of the fluid generated near the second resistance facing surface 422 in the passage between the closing surface protrusion 613 and the third valve 35. In the present embodiment, the closing surface protrusion 613 is arranged such that the gap D2 is equal to or less than about 2 mm.

As shown in FIG. 2, the closing surface protrusion 613 has the stopper 615 at a first end of the closing surface protrusion 613 located away from the opening-closing surface 67 in the axial direction DRa. The stopper 615 restricts the valve 30 from rotating by engaging with the valve-positioning portion 355 when the valve 30 rotates.

The stopper 615 extends in the radial direction DRr from the first end of the closing surface protrusion 613 to overlap with the valve-positioning portion 355 in the circumferential direction of the shaft 32. As shown in FIG. 9, the stopper 615 has a rod shape and extends toward the shaft connecting portion 316 in the radial direction DRr. The stopper 615 is in contact with the shaft connecting portion 316.

Figure 11:
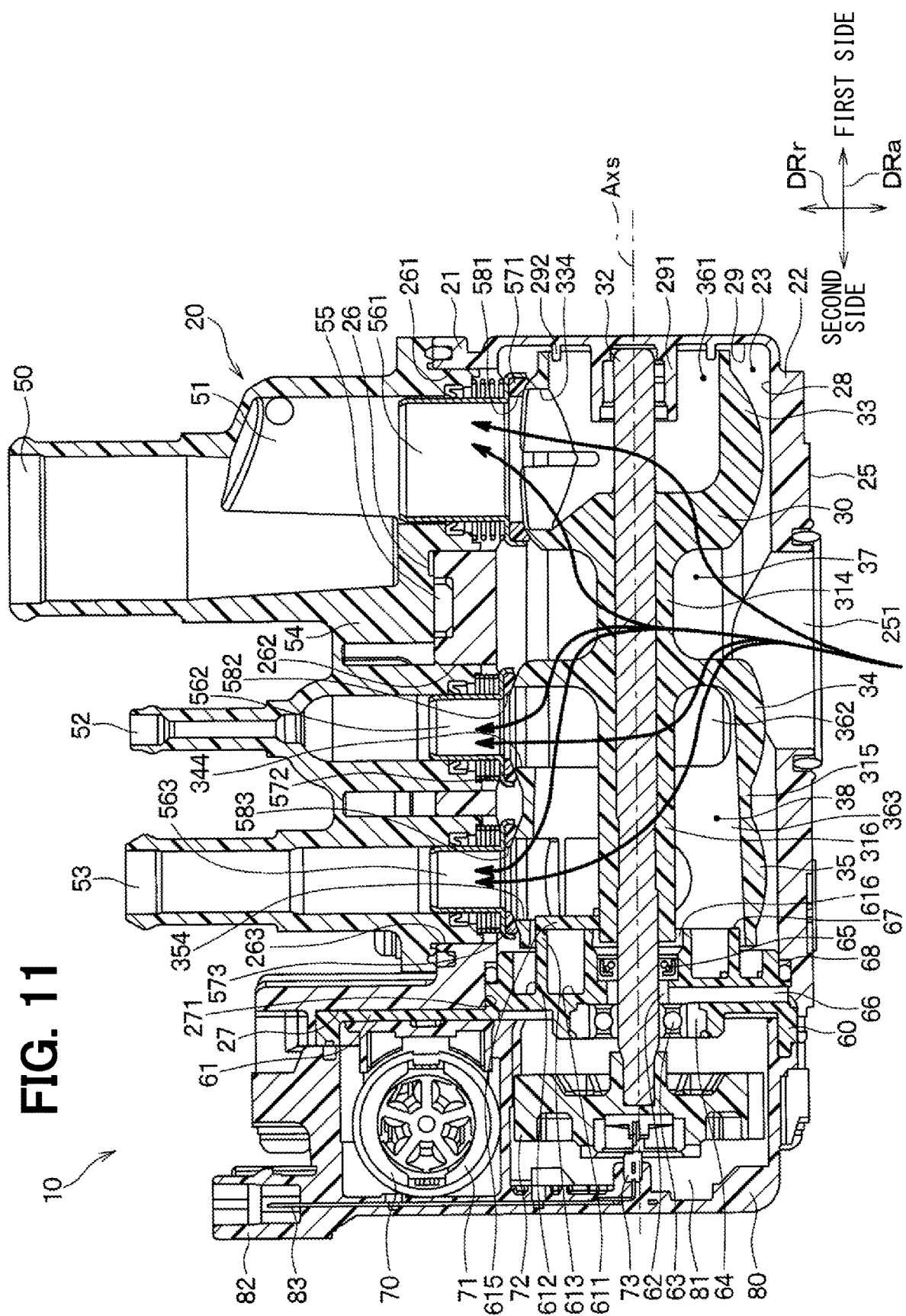
FIG. 11 is a schematic view illustrating an operation of the valve device in the first embodiment.

Next, an operation of the valve device 10 will be described with reference to FIG. 11. The ECU (not shown) calculates, based on a driving state of the vehicle, amounts of the cooling water required respectively for the air-conditioning heat exchanger 3, the oil cooler 4, and the radiator 5. The ECU calculates a rotation angle of the valve 30 (i.e., a rotation angle of the motor 71) to supply the required amount of the cooling water for each of the air-conditioning heat exchanger 3, the oil cooler 4, and the radiator 5. Then, the ECU transmits information on the calculated rotation angle of the motor 71 to the valve device 10.

The valve device 10 rotates the motor 71 based on the information on the rotation angle received from the ECU. The valve device 10 rotates the motor 71 to rotate the valve 30 through the gear unit 72 and the shaft 32, so that the required amount of the cooling water is supplied through the first outer circumferential opening 334, the second outer circumferential opening 344, and the third outer circumferential opening 354.

Specifically, when the valve device 10 allows the cooling water to flow out toward the radiator 5 through the first outer circumferential opening 334, the valve device 10 rotates the valve 30 to fluidly connect the first outer circumferential opening 334 to the first outlet port 261. In addition, the valve device 10 adjusts the rotational position of the valve 30 and the overlapping area between the first outer circumferential opening 334 and the first seal opening 581 such that the required amount of the cooling water flows to the radiator 5. As shown in FIG. 11, the valve device 10 allows the cooling water having flown into the valve housing space 23 through the inlet port 251 to flow into the first passage 361 through the first inner openings 336. The cooling water having flown into the first passage 361 flows out toward the first outlet port 261 through the first outer circumferential opening 334.

In addition, when the valve device 10 allows the cooling water to flow out through the second outer circumferential opening 344 to the air-conditioning heat exchanger 3, the valve device 10 rotates the valve 30 to fluidly connects the second outer circumferential opening 344 of the second valve 34 to the second outlet port 262. The valve device 10 adjusts the rotational position of the valve 30 and the overlapping area between the second outer circumferential opening 344 and the second seal opening 582 such that the required amount of the cooling water flows toward the air-conditioning heat exchanger 3. As shown in FIG. 11, the valve device 10 allows the cooling water having flown into the valve housing space 23 through the inlet port 251 to flow into the second passage 362 through the second inner openings 346. The cooling water having flown into the second passage 362 flows out through the second outer circumferential opening 344 to the second outlet port 262.

In addition, when the valve device 10 allows the cooling water to flow toward the oil cooler 4 through the third outer circumferential opening 354, the valve device 10 fluidly connects the third outer circumferential opening 354 of the third valve 35 to the third outlet port 263 by rotating the valve 30. The valve device 10 adjust the rotational position of the valve 30 and the overlapping area between the third outer circumferential opening 354 and the third seal opening 583 to allow the required amount of the cooling water to flow toward the oil cooler 4. As shown in FIG. 11, the valve device 10 allows the cooling water having flown into the valve housing space 23 through the inlet port 251 to flow into the third passage 363 through the second passage 362 of the second valve 34. The cooling water having flown into the third passage 363 flows out through the third outlet port 263 via the third outer circumferential opening 354.

The valve device 10 includes the rotation angle sensor 73 configured to detect the rotation angle of the third gear 723 and feedbacks the information on the detected rotation angle to the ECU, thereby adjusting the rotation angle of the motor 71.

According to the valve device 10 of the present embodiment described above, the valve device 10 includes the bottom surface protrusion 292 and the closing surface protrusion 613. The bottom surface protrusion 292 and the closing surface protrusion 613 are located radially outward of the shaft 32 and protrude in the axial direction DRa. That is, the housing inner bottom surface 29 includes the bottom surface protrusion 292 serving as a resistance to restrict the cooling water from flowing toward the gap S1. The opening-closing surface 67 has the closing surface protrusion 613 serving as a resistance to restrict the cooling water from flowing toward the gap S2.

Accordingly, the valve device 10 can restrict the cooling water from flowing into the gap S1 and the gap S2 and from flowing out of the gap S1 and the gap S2. If the cooling water flows in and out of the gap S1, the amount of the cooling water flowing out through the first outer circumferential opening 334 may vary. Since the valve device 10 can reduce the variation of the amount of the cooling water caused by the gap S1, the valve device 10 can accurately adjust the amount of the cooling water flowing out through the first outer circumferential opening 334. If the cooling water flows in and out of the gap S2, the amount of the cooling water flowing out through the third outer circumferential opening 354 may vary. Since the valve device 10 can reduce a variation in the amount of the cooling water caused by the gap S2, the amount of the cooling water flowing out through the third outer circumferential opening 354 is accurately adjusted.

The bottom surface protrusion 292 and the closing surface protrusion 613 are located radially outward of the shaft 32. Therefore, in the valve device 10, the bottom surface protrusion 292 can be easily arranged at a position close to the housing inner bottom surface 29. The closing surface protrusion 613 can be easily arranged at a position close to the opening-closing surface 67.

Therefore, the valve device 10 is likely to restrict the cooling water from flowing into and out of the gap S1 and the gap S2 compared with a case that both the bottom surface protrusion 292 and the closing surface protrusion 613 are located radially inward of the shaft 32. Therefore, the valve device 10 can more accurately control the amount of the cooling water flowing out of the first outer circumferential opening 334 and the third outer circumferential opening 354 compared to the case that the bottom surface protrusion 292 and the closing surface protrusion 613 are located radially inward of the shaft 32.

In the valve device 10, the bottom surface protrusion 292 is located radially inward of the first outer opening 338. The closing surface protrusion 613 is located radially inward of the third outer opening 356. The bottom surface protrusion 292 is arranged in the passage through which the cooling water flows from the outside of the first valve 33 toward the first outer opening 338 through the gap S1. The bottom surface protrusion 292 is located in the passage at a position downstream of the gap S1 in the flow direction of the cooling water. The closing surface protrusion 613 is arranged in the passage through which the cooling water flows from the outside of the third valve 35 toward the third outer opening 356 through the gap S2. The closing surface protrusion 613 is located in the passage at a position downstream of the gap S2 in the flow direction of the cooling water.

In this case, the cooling water flowing from the outside of the first valve 33 toward the first outer opening 338 is likely to be reflected at the bottom surface protrusion 292 after flowing through the gap S1. The cooling water flowing from the outside of the third valve 35 toward the third outer opening 356 is likely to be reflected at the closing surface protrusion 613 after flowing through the gap S2. Therefore, the valve device 10 can easily restrict the cooling water from flowing into the valve 30 through the first outer opening 338 and the third outer opening 356.

Therefore, the valve device 10 can suppress a pressure loss generated when the cooling water flowing through the first passage 361 toward the first outer circumferential opening 334 collides against the cooling water flowing into the first passage 361 through the first outer opening 338. The valve device 10 can suppress a pressure loss generated when the cooling water flowing through the third passage 363 toward the third outer circumferential opening 354 collides against the cooling water flowing into the third passage 363 through the third outer opening 356. Therefore, the valve device 10 can accurately control the flow rate of the cooling water flowing out of the first outer circumferential opening 334 and the third outer circumferential opening 354.

The bottom surface protrusion 292 and the closing surface protrusion 613 of the valve device 10 annularly protrude, so that the bottom surface protrusion 292 and the closing surface protrusion 613 can be arranged in the circumferential direction of the first outer opening 338 and the third outer opening 356 having circular shapes. Therefore, the valve device 10 is likely to restrict the cooling water from flowing into and out of the first outer opening 338 and the third outer opening 356 compared to a case that the bottom surface protrusion 292 and the closing surface protrusion 613 are not formed into an annular shape.

In addition, the valve device 10 can increase thicknesses of walls of the housing 20 in which the bottom surface protrusion 292 and the closing surface protrusion 613 are arranged. As a result, a strength of the walls of the housing 20 in which the bottom surface protrusion 292 and the closing surface protrusion 613 are arranged can be increased.

In the valve device 10, the bottom surface protrusion 292 and the first valve extending portion 339 overlap with each other in the radial direction DRr. The combination of the gap S1 and the passage in communication with the gap S1 constitute a labyrinth structure. In the valve device 10, the closing surface protrusion 613 and the third valve extending portion 359 overlap with each other in the radial direction DRr. The combination of the gap S2 and the passage in communication with the gap S2 constitute a labyrinth structure.

Thus, in the valve device 10, the passage through which the cooling water flows in and out of the first outer opening 338 can be longer compared to a case that the bottom surface protrusion 292 and the first valve extending portion 339 do not overlap with each other. The valve device 10 can change the flow direction of the cooling water by reflecting the cooling water flowing through the passage constituted by the passage in communication with the gap S1 and the gap S1 at the bottom surface protrusion 292 and the housing inner bottom surface 29. Thus, the valve device 10 can increase the pressure loss of the passage constituted by the passage in communication with the gap S1 and the gap S1.

In addition, in the valve device 10, the passage through which the cooling water flows in and out of the third outer opening 356 can be longer compared to a case that the closing surface protrusion 613 and the third valve extending portion 359 do not overlap with each other. The valve device 10 can change the flow direction of the cooling water by reflecting the cooling water flowing through the passage constituted by the passage in communication with the gap S2 and the gap S2 at the closing surface protrusion 613 and the opening-closing surface 67. Thus, the valve device 10 can increase the pressure loss of the passage constituted by the passage in communication with the gap S2 and the gap S2.

Accordingly, the valve device 10 can restrict the cooling water from flowing into and out of the gap S1 and the gap S2, so that the valve device 10 can accurately control the amount of the cooling water flowing out of the first outer circumferential opening 334 and the third outer circumferential opening 354. The valve device 10 is arranged such that the gap D1 is smaller than the gap in the radial direction DRr between the shaft 32 and the first fluid resistance surface 411. The valve device 10 is arranged such that the gap D2 is smaller than the gap in the radial direction DRr between the shaft 32 and the second fluid resistance surface 412.

Accordingly, the passage between the first fluid resistance surface 411 and the first resistance facing surface 421 is narrow and has a large pressure loss compared to the case that the gap D1 is larger than the gap between the shaft 32 and the first fluid resistance surface 411. The passage between the second fluid resistance surface 412 and the second resistance facing surface 422 is narrow and has a large pressure loss compared to the case that the gap D2 is larger than the gap between the shaft 32 and the second fluid resistance surface 412.

Thus, the valve device 10 can restrict the cooling water from flowing into and out of the gap S1 compared to the case that the gap D1 is larger than the gap between the shaft 32 and the first fluid resistance surface 411. As a result, the amount of the cooling water flowing out of the first outer circumferential opening 334 is accurately controlled. The valve device 10 can restrict the cooling water from flowing into and out of the gap S2 compared to the case that the gap D2 is larger than the gap between the shaft 32 and the second fluid resistance surface 412. As a result, the amount of the cooling water flowing out of the third outer circumferential opening 354 is accurately controlled.

The valve device 10 is arranged such that the gap D1 is smaller than the gap in the axial direction DRa between the first valve outer surface 333 and the housing inner bottom surface 29. The valve device 10 is located such that the gap D2 is smaller than the gap in the axial direction DRa between the third valve outer surface 352 and the opening-closing surface 67.

The passage between the first fluid resistance surface 411 and the first resistance facing surface 421 is located in a downstream side in the passage through which the cooling water flows from the outside of the first valve 33 toward the first passage 361. The passage between the first fluid resistance surface 411 and the first resistance facing surface 421 is narrower and has a larger pressure loss compared to a passage in an upstream side in the passage through which the cooling water flows from the outside of the first valve 33 toward the first passage 361. The passage between the second fluid resistance surface 412 and the second resistance facing surface 422 is located in a downstream side in the passage through which the cooling water flows from the outside of the third valve 35 toward the third passage 363 in the flow direction of the cooling water. The passage between the second fluid resistance surface 412 and the second resistance facing surface 422 is narrower and has a larger pressure loss compared to a passage located in an upstream side in the passage through which the cooling water flows from the outside of the third valve 35 toward the third passage 363.

Thus, the cooling water is restricted from flowing into the valve 30 through the first outer opening 338 compared to a case that the gap D1 is larger than the gap between the first valve outer surface 333 and the housing inner bottom surface 29, so that the amount of the cooling water flowing out of the first outer circumferential opening 334 can be accurately controlled. Similarly, the cooling water is restricted from flowing into the valve 30 through the third outer opening 356 compared to a case that the gap D2 is larger than the gap between the third valve outer surface 352 and the opening-closing surface 67, so that the amount of the cooling water flowing out of the third outer circumferential opening 354 can be accurately controlled.

By the way, in this embodiment, the valve 30 is molded by injection molding in which a resin member is filled in a mold. The molten resin for molding the valve 30 generates a gas inside the mold when molding the valve 30. Since the gas flows toward a downstream side of the mold in a flow of the resin together with the resin when the mold is filled with the resin, the gas is likely to remain at a position of the mold at which the first end or the second end of valve 30 in the axial direction DRa is molded inside the mold.

When the valve 30 is injection-molded in a state where the gas remains at the portion at which the first end or the second end of the valve 30 is molded inside the mold, the gas is compressed by the filled resin member and a heat is generated. This may cause to generate a burning on the surface of the the first end or the second end of the valve 30 when the valve 30 is molded with the resin.

On the other hand, the valve 30 has the first valve extending portion 339 at the first end of the valve 30 in the axial direction DRa and the third valve extending portion 359 at the second end of the valve 30 in the axial direction DRa. Thus, the burning caused by the gas generated when the valve 30 is molded is likely to occur on the surface of the first valve extending portion 339 and the surface of the third valve extending portion 359.

The first valve extending portion 339 extends a passage between the first fluid resistance surface 411 and the first resistance facing surface 421. The third valve extending portion 359 extends a passage between the second fluid resistance surface 412 and the second resistance facing surface 422. Thus, the defect such as burnings generated on the surfaces of the first valve extending portion 339 and the third valve extending portion 359 does not affect on the extension of the passage between the first fluid resistance surface 411 and the first resistance facing surface 421 and the extension of the passage between the second fluid resistance surface 412 and the second resistance facing surface 422.

Therefore, the valve device 10 can secure a sufficient passage between the first fluid resistance surface 411 and the first resistance facing surface 421 and reduce an influence of the defect caused by the gas generated in molding the valve 30 compared to a case without the first valve extending portion 339. The valve device 10 can secure a sufficient passage between the second fluid resistance surface 412 and the second resistance facing surface 422 and reduce an influence of the defect caused by the gas generated in molding the valve 30 compared to a case without the third valve extending portion 359.

The bottom surface protrusion 292 does not overlap with the first outer circumferential opening 334 in the radial direction DRr. The closing surface protrusion 613 does not overlap with the third outer circumferential opening 354 in the radial direction DRr. Thus, the valve device 10 can restrict the cooling water flowing out of the first outer circumferential opening 334 and the third outer circumferential opening 354 from reflecting at the bottom surface protrusion 292 and the closing surface protrusion 613 and from having difficulty in flowing.

The valve device 10 has the valve-positioning portion 355 protruding in the radial direction DRr inside the valve 30. Thus, the valve device 10 can reduce a size of the valve 30 in the axial direction DRa compared to a case that the valve-positioning portion 355 protrudes from the third valve outer surface 352 in the axial direction DRa of the shaft 32.

The closing surface protrusion 613 includes the stopper 615 configured to stop the rotation of the valve 30 at a reference position in the circumferential direction of the valve 30. Thus, the valve device 10 can be simplified in a structure compared to a case that the stopper 615 that is a different member from the closing surface protrusion 613 is disposed inside the housing 20.

In the valve device 10, the shaft outer circumferential portion 321 has the shaft flat portion 322 and the shaft connecting portion 316 has the connecting flat portion 317 that is in contact with the shaft flat portion 322. Therefore, the valve device 10 can rotate the valve 30 with a force of the shaft flat portion 322 pressing against the connecting flat portion 317 in addition to a frictional force generated between the inner circumferential portion of the shaft connecting portion 316 and the shaft outer circumferential portion 321. As a result, the valve device 10 can rotate the valve 30 more easily compared to a case in which the valve 30 is rotated only by the frictional force generated between the inner circumferential portion of the shaft connecting portion 316 and the shaft outer circumferential portion 321. Even if the valve device 10 does not include the bottom surface protrusion 292 and the closing surface protrusion 613, the valve 30 can be easily rotated by introducing the shaft flat portion 322 in the shaft outer circumferential portion 321 and the connecting flat portion 317 in the shaft connecting portion 316.

By the way, regarding the force for rotating the valve 30, the force of the shaft flat portion 322 pressing against the shaft connecting portion 316 is larger than the frictional force generated between the inner circumferential portion of the shaft connecting portion 316 and the shaft outer circumferential portion 321. Thus, a portion of the valve 30 where the shaft flat portion 322 presses against the shaft connecting portion 316 may be elastically deformed in the circumferential direction of the valve 30 with the rotational force transmitted from the shaft 32. Such elastic deformation causes a displacement of the reference position in the circumferential direction of the valve 30 determined by the valve-positioning portion 355. Further, the displacement of the reference position becomes larger as the distance between the portion that is elastically deformed and the valve-positioning portion 355 in the axial direction DRa becomes larger.

On the other hand, the connecting flat portion 317 is arranged at a position overlapping with the valve-positioning portion 355 in the radial direction DRr. Thus, the valve device 10 can reduce a distance between the connecting flat portion 317 and the valve-positioning portion 355 in the axial direction DRa compared to a case in which the connecting flat portion 317 and the valve-positioning portion 355 do not overlap with each other in the radial direction DRr. Therefore, the valve device 10 can easily restrict the valve 30 from being displaced from the reference position caused by the deformation of the connecting flat portion 317 even if the rotational force transmitted from the shaft flat portion 322 elastically deforms the connecting flat portion 317 in the circumferential direction of the valve 30. Even if the valve device 10 does not have the bottom surface protrusion 292 and the closing surface protrusion 613, the valve device 10 can easily restrict the valve 30 from being displaced from the reference position while the connecting flat portion 317 overlaps with the valve-positioning portion 355 in the radial direction DRr.

Further, in this embodiment, when the valve device 10 is used in an environment having a temperature lower than a predetermined temperature and an elapsed time from when the internal combustion engine 2 is started is short, a part of the cooling water may be frozen to be ice since a heat dissipated from the internal combustion engine 2 of the vehicle is small. In this case, the cooling water will circulate together with the ice through the valve device 10. In this case, when the valve 30 rotates, foreign matter such as ice may be caught between the first valve outer circumferential portion 331 to the third valve outer circumferential portion 351 and the housing inner circumferential surface 28, so that it may be impossible for the valve 30 to rotate.

In contrast, the valve device 10 is disposed such that a distance between the connecting flat portion 317 and the third valve outer surface 352, which is the closest to the driving unit 70 of the first valve outer surface 333 and the third valve outer surface 352 is equal to or lower than half the total length L2 of the valve 30.

Therefore, the valve device 10 can position a portion in which the shaft flat portion 322 is in contact with the connecting flat portion 317 close to the driving unit 70 compared to a case in which the distance between the third valve outer surface 352 and the connecting flat portion 317 is larger than half the total length L2 of the valve 30. Accordingly, the valve device 10 can position the portion where the rotational force transmitted from the driving unit 70 is transmitted to the connecting flat portion 317 via the shaft flat portion 322 in the vicinity of the driving unit 70.

Therefore, the valve device 10 is likely to transmit the rotational force transmitted from the driving unit 70 to the foreign matters when the foreign matters such as ice are caught between the housing inner circumferential surface 28 and the first valve outer circumferential portion 331 to the third valve outer circumferential portion 351. Therefore, even if the foreign matters such as ice are caught in the valve device 10, the valve device 10 can easily remove or destroy the foreign matters such as ice by transmitting the rotational force from the driving unit 70 to the foreign matters. Even if the valve device 10 does not have the bottom surface protrusion 292 and the closing surface protrusion 613, the valve device 10 can easily transmit the rotational force transmitted from the driving unit 70 to the foreign matters by setting the distance between the end of the valve 30 closer to the driving unit 70 and the connecting flat portion 317 to be equal to or less than half the total length L2 of the valve 30.

Second Embodiment

Next, a second embodiment will be described with reference to FIGS. 12 to 14. In this embodiment, portions different from those of the first embodiment will be mainly described.

Figure 12:
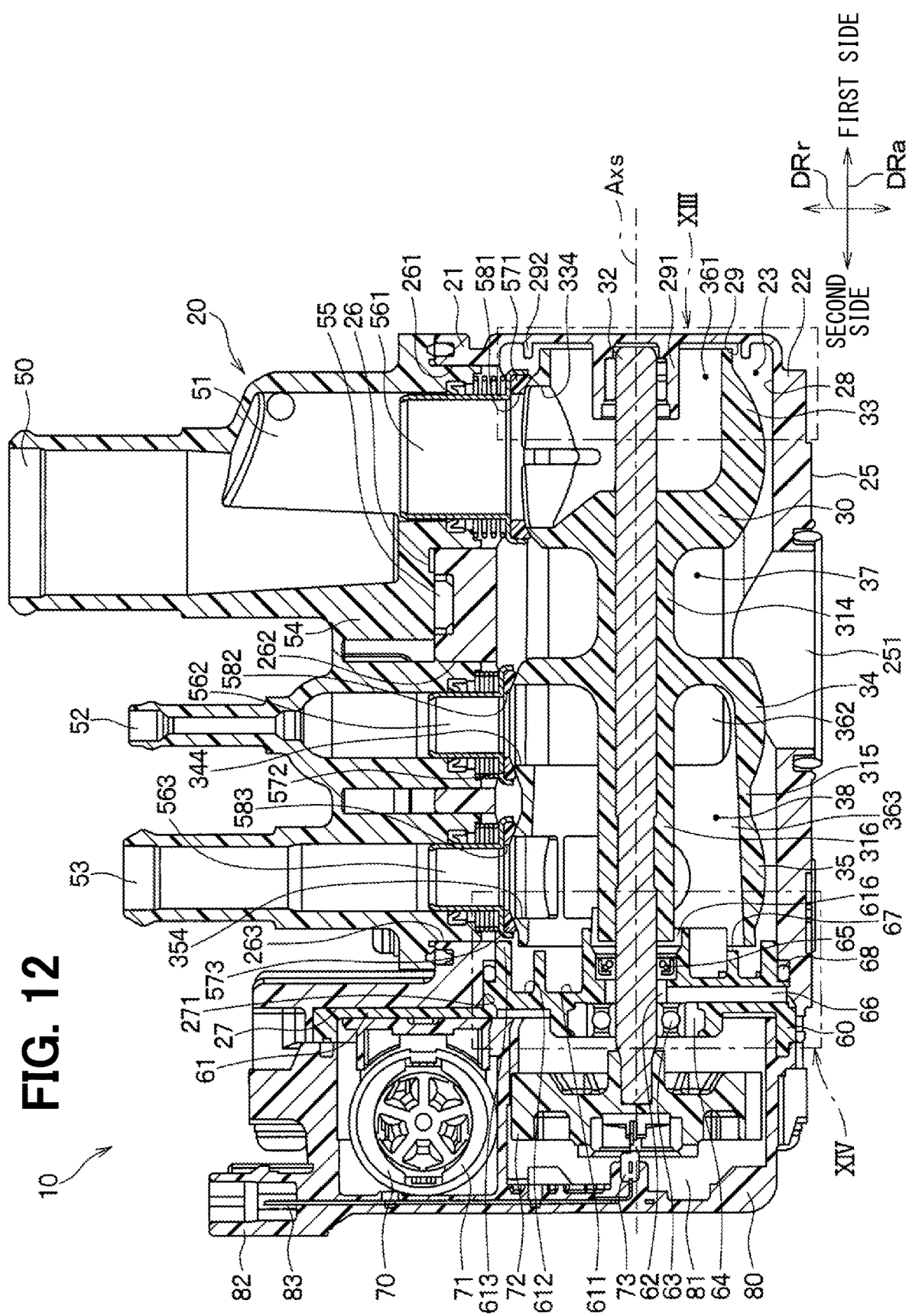
FIG. 12 is a schematic cross-sectional view of a valve device in a second embodiment.
Figure 13:
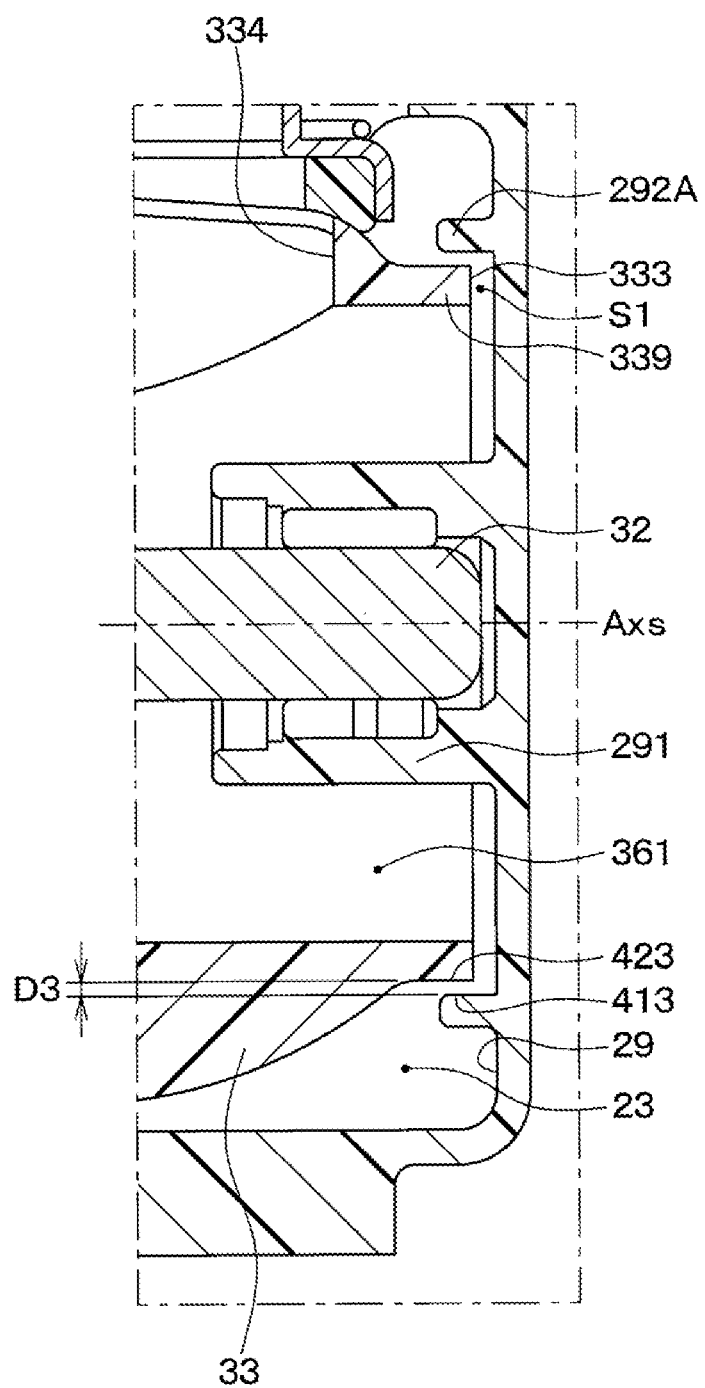
FIG. 13 is an enlarged view of a part XIII in FIG. 12.

As shown in FIGS. 12 and 13, in this embodiment, the housing inner bottom surface 29 includes a bottom surface protrusion 292A corresponding to the bottom surface protrusion 292 in the first embodiment. The bottom surface protrusion 292A is located radially outward of the first valve outer surface 333. That is, the bottom surface protrusion 292A in this embodiment is arranged such that a gap between the shaft 32 and the bottom surface protrusion 292A is larger than the gap in the radial direction DRr between the shaft 32 and the first valve outer surface 333. In this embodiment, the bottom surface protrusion 292A corresponds to a protrusion.

The bottom surface protrusion 292A has a tip end at an inner circumferential portion of the bottom surface protrusion 292A. The first valve extending portion 339 includes a tip end at an outer circumferential portion of the first valve extending portion 339. The tip end of the bottom surface protrusion 292A faces the tip end of the first valve extending portion 339.

In this embodiment, the bottom surface protrusion 292A has a first fluid resistance surface 413 that faces the outer circumferential portion of the first valve extending portion 339 in the radial direction DRr. In addition, the first valve extending portion 339 has a first resistance facing surface 423 in the outer circumferential portion of the first valve extending portion 339. The first resistance facing surface 423 faces the first fluid resistance surface 413 in the radial direction DRr. In this embodiment, the first fluid resistance surface 413 corresponds to a fluid resistance surface. The first resistance facing surface 423 corresponds to a resistance facing surface.

The bottom surface protrusion 292A is arranged such that a gap D3 is defined between the first resistance facing surface 423 and the first fluid resistance surface 413 in the radial direction DRr. Although the bottom surface protrusion 292A has a position in the radial direction DRr that is different from a position of the bottom surface protrusion 292 in the first embodiment, the shape, the size in the axial direction DRa, and the thickness of the bottom surface protrusion 292A are set similarly to the bottom surface protrusion 292 in the first embodiment. Further, the gap D3 is set similarly to the gap D1 in the first embodiment.

Figure 14:
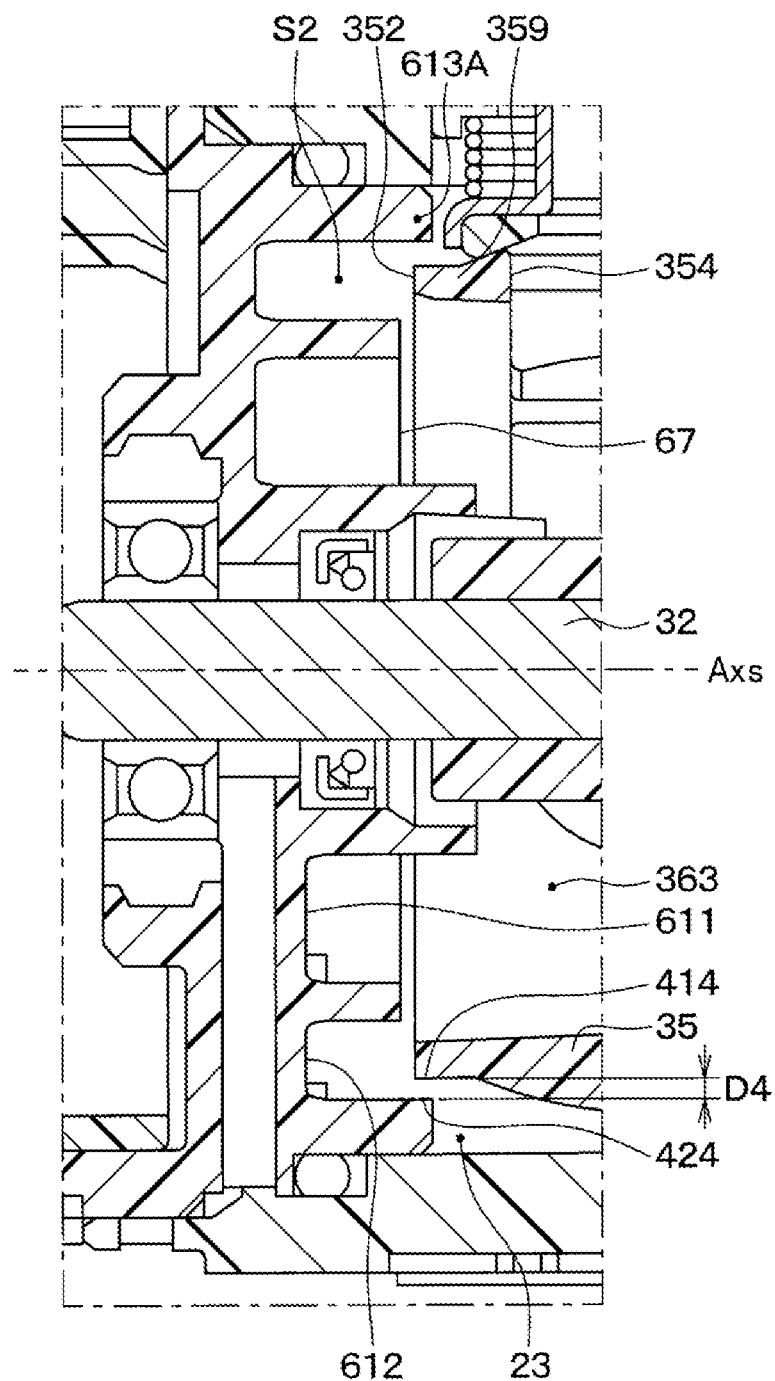
FIG. 14 is an enlarged view of a part XIV in FIG. 12.

As shown in FIGS. 12 and 14, in this embodiment, the opening-closing surface 67 has a closing surface protrusion 613A corresponding to the closing surface protrusion 613 in the first embodiment. The closing surface protrusion 613A is located radially outward of the third valve outer surface 352. That is, the closing surface protrusion 613A is arranged such that a gap in the radial direction DRr between the shaft 32 and the closing surface protrusion 613A is larger than the gap in the radial direction DRr between the shaft 32 and the third valve outer surface 352. In this embodiment, the closing surface protrusion 613A corresponds to a protrusion.

In addition, the closing surface protrusion 613A is radially outward of the outer recess 612. The opening-closing surface 67 has an outer edge that protrudes toward the first side of the valve 30 in the axial direction DRa.

The closing surface protrusion 613A has a tip end at an inner circumferential portion of the closing surface protrusion 613A. The third valve extending portion 359 has the tip end at the outer circumferential portion of the third valve extending portion 359. The tip end of the closing surface protrusion 613A faces the tip end of the third valve extending portion 359 in the radial direction DRr.

In this embodiment, the closing surface protrusion 613A has a second fluid resistance surface 414 that faces the outer circumferential portion of the third valve extending portion 359 in the radial direction DRr. In addition, the third valve extending portion 359 has a second resistance facing surface 424 that faces the second fluid resistance surface 414 in the radial direction DRr. In this embodiment, the second fluid resistance surface 414 corresponds to a fluid resistance surface. The second resistance facing surface 424 corresponds to the resistance facing surface.

The closing surface protrusion 613A is disposed such that a gap D4 is defined between the second resistance facing surface 424 and the second fluid resistance surface 414 in the radial direction DRr. The closing surface protrusion 613A is located at a different position, in the radial direction DRr, from a position of the closing surface protrusion 613 in the first embodiment, but the shape, the size in the axial direction DRa, and the thickness of the closing surface protrusion 613A are set similarly to the closing surface protrusion 613 in the first embodiment. The gap D4 is set similarly to the gap D2 in the first embodiment.

According to the valve device 10 in the present embodiment described above, the bottom surface protrusion 292A is located radially outward of the first outer opening 338. In addition, the closing surface protrusion 613A is located radially outward of the third outer opening 356. The bottom surface protrusion 292A is located in the passage through which the cooling water flowing out of the first valve 33 through the first outer opening 338 flows. The bottom surface protrusion 292A is located in the passage at a position downstream of the gap S1 in the flow direction of the cooling water. The closing surface protrusion 613A is located in the passage through which the cooling water flowing out of the third valve 35 through the third outer opening 356 flows. The closing surface protrusion 613A is located in the passage at a position downstream of the gap S2 in the flow direction of the cooling water.

In this case, the cooling water flowing out of the first outer opening 338 is likely to reflect at the bottom surface protrusion 292A after flowing through the gap S1. The cooling water flowing out of the third outer opening 356 is likely to reflect at the closing surface protrusion 613A after flowing through the gap S2. Thus, the valve device 10 easily restricts the cooling water from flowing out of the valve device 10 through the first outer opening 338 and from flowing out of the valve device 10 through the third outer opening 356. As a result, the valve device 10 can restrict the cooling water from flowing out of the gap S1 and the gap S2, so that the valve device 10 can accurately control the amount of the cooling water flowing out through the first outer circumferential opening 334 and the third outer circumferential opening 354.

Third Embodiment

A third embodiment will be described with reference to FIGS. 15 and 16. In this embodiment, portions different from those of the first embodiment will be mainly described.

Figure 15:
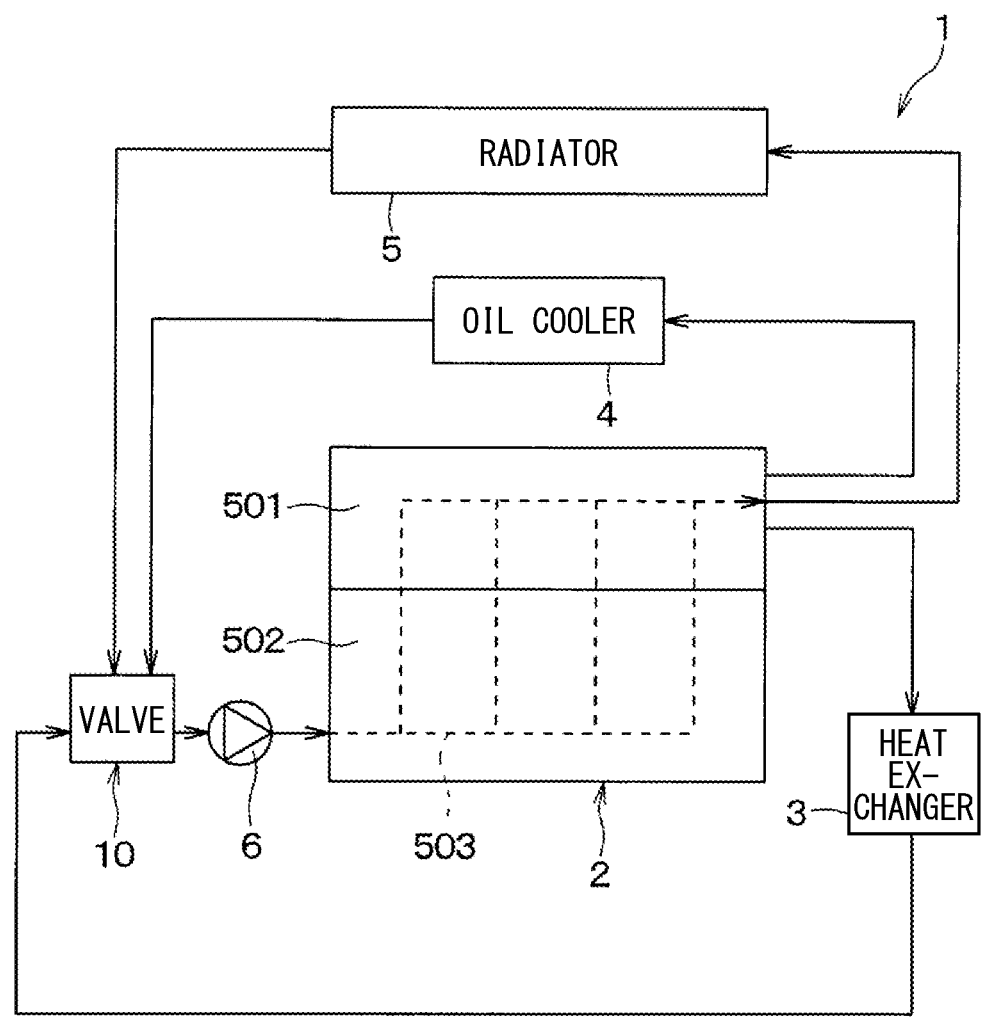
FIG. 15 is a schematic diagram of a cooling system using a valve device according to a third embodiment.
Figure 16:
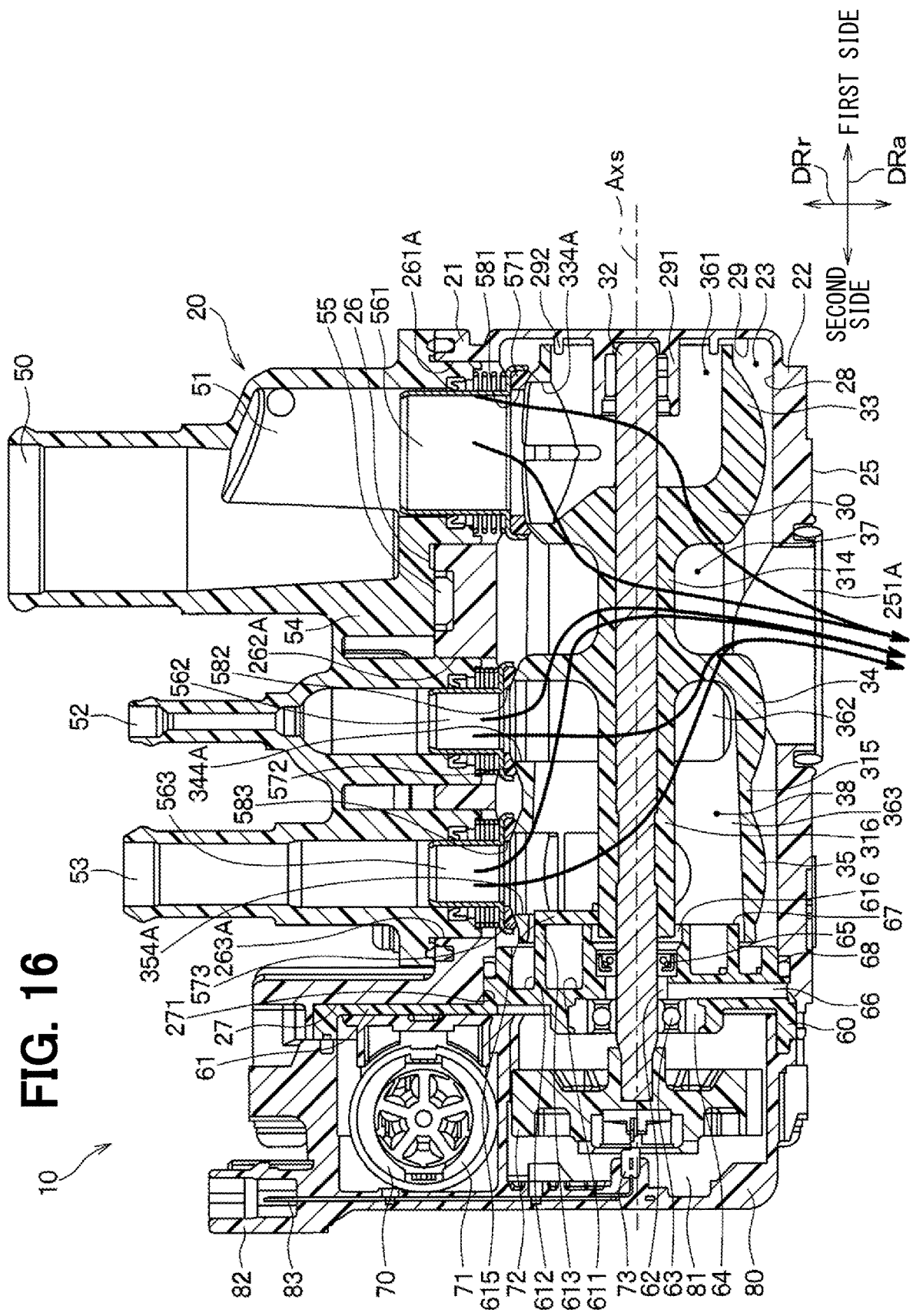
FIG. 16 is a schematic view illustrating an operation of the valve device in the third embodiment.

In this embodiment, as shown in FIG. 15, the valve device 10 is located in an inlet side of the water jacket 503 and at a position upstream of the water pump 6 in the flow direction of the cooling water in the cooling system 1. The valve device 10 is connected to the air-conditioning heat exchanger 3, the oil cooler 4, and the radiator 5 in the upstream side of the valve device 10, and is connected to the water pump 6 in the downstream side of the valve device 10.

Specifically, the valve device 10 defines a first outlet port 261A corresponding to the first outlet port 261 in the first embodiment that is connected to the radiator 5. The valve device 10 defines a second outlet port 262A corresponding to the second outlet port 262 in the first embodiment that is connected to the air-conditioning heat exchanger 3. The valve device 10 further defines a third outlet port corresponding to the third outlet port 263 in the first embodiment that is connected to the oil cooler 4.

The valve device 10 arranged in this manner rotates the valve 30 to fluidly connects the first outer circumferential opening 334 to the first outlet port 261A, so that the cooling water flowing out of the radiator 5 is supplied into the first valve 33 through the first outer circumferential opening 334. In addition, the valve device 10 rotates the valve 30 to fluidly connect the second outer circumferential opening 344 to the second outlet port 262A, so that the cooling water flowing out of the air-conditioning heat exchanger 3 is supplied into the third valve 35 through the second outer circumferential opening 344. Similarly, the valve device 10 rotates the valve 30 to fluidly connect the third outer circumferential opening 354 to a third outlet port 263A, so that the cooling water flowing out of the oil cooler 4 is supplied into the third valve 35 through the third outer circumferential opening 354.

In addition, the valve device 10 allows the cooling water having flown into the first valve 33 to flow to an outside of the first valve 33 through the first inner openings 336 and to further flow to an outside of the valve device 10 through an inlet port 251A corresponding to the inlet port 251 in the first embodiment. The valve device 10 allows the cooling water having flown into the second valve 34 and the third valve 35 to flow to an outside of the second valve 34 and the third valve 35 through the second inner openings 346 and to flow to the outside of the valve device 10 through the inlet port 251A.

In this embodiment, the inlet port 251A corresponds to an outlet opening. The first outlet port 261A, the second outlet port 262A, and the third outlet port 263A correspond to an inlet opening.

The valve device 10 adjusts the rotational position of the valve 30 to adjust the overlapping area between the first outer circumferential opening 334 and the first seal opening 581. As a result, the amount of the cooling water flowing into the first valve 33 through the first outlet port 261A can be controlled. The valve device 10 adjusts the rotational position of the valve 30 to adjust the overlapping area between the second outer circumferential opening 344 and the second seal opening 582. As a result, the amount of the cooling water flowing into the second valve 34 through the second outlet port 262A can be controlled. The valve device 10 adjusts the rotational position of the valve 30 to adjust the overlapping area between the third outer circumferential opening 354 and the third seal opening 583. As a result, the flow amount of the cooling water flowing into the third valve 35 through the third outlet port 263A can be controlled.

The other configurations are similar to those of the first embodiment. The valve device 10 in this embodiment can generate advantages similar to the advantages in the first embodiment by using a configuration common to or equivalent of the configuration in the first embodiment.

Other Embodiments

Although representative embodiments of the present disclosure have been described above, the present disclosure is not limited to the embodiments described above, and various modifications can be made, for example, as follows.

Figure 17:
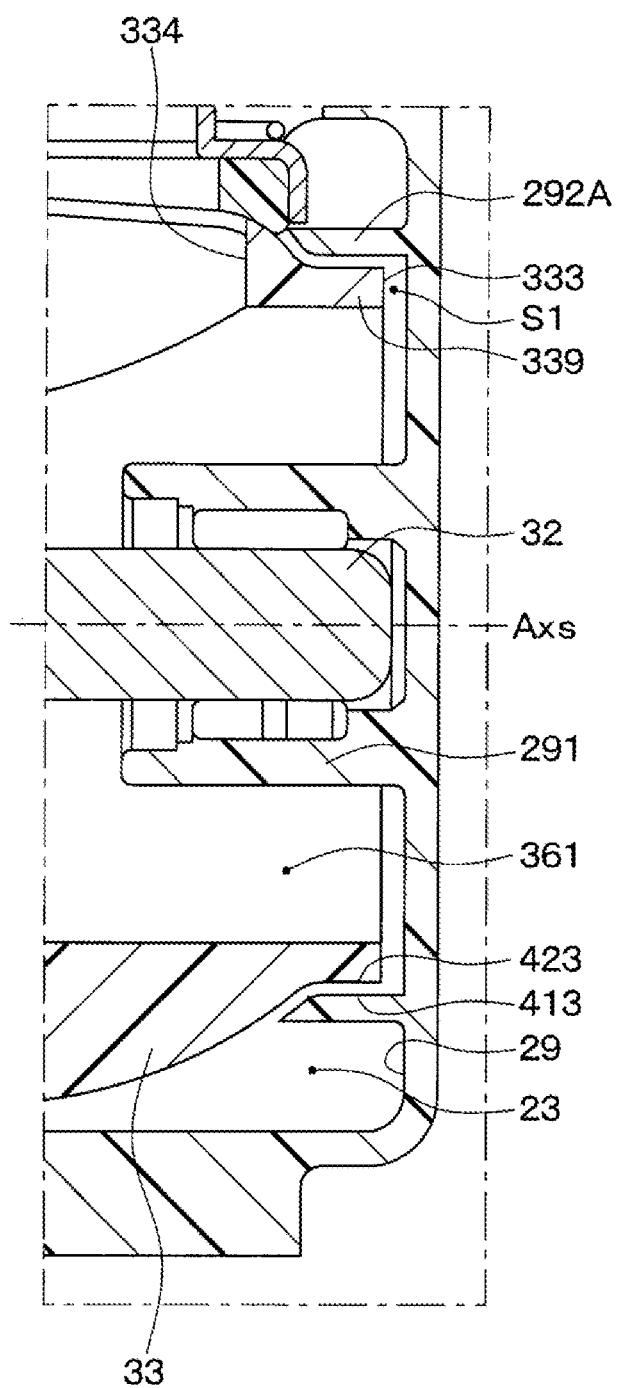
FIG. 17 is a cross-sectional view of a valve device in other embodiment corresponding to FIG. 13.

In the above-described embodiment, an example in which the bottom surface protrusion 292A is arranged at a position facing the first valve extending portion 339 in the radial direction DRr has been described, but the present invention is not limited to this. For example, the bottom surface protrusion 292A may extend toward the second side of the valve 30 over the first valve extending portion 339 in the axial direction DRa. Specifically, as shown in FIG. 17, the bottom surface protrusion 292A may be extend to a position facing a portion of the first valve outer circumferential portion 331 that expands outward in the radial direction DRa relative to the both ends in the axial direction DRa.

In this case, the tip end of the bottom surface protrusion 292A is formed along the shape of the first valve outer circumferential portion 331. That is, the tip end of the bottom surface protrusion 292A is formed such that an inner diameter of the bottom surface protrusion 292A increases toward the tip end and a thickness of the bottom surface protrusion 292A in the radial direction DRr decreases toward the tip end.

Figure 18:
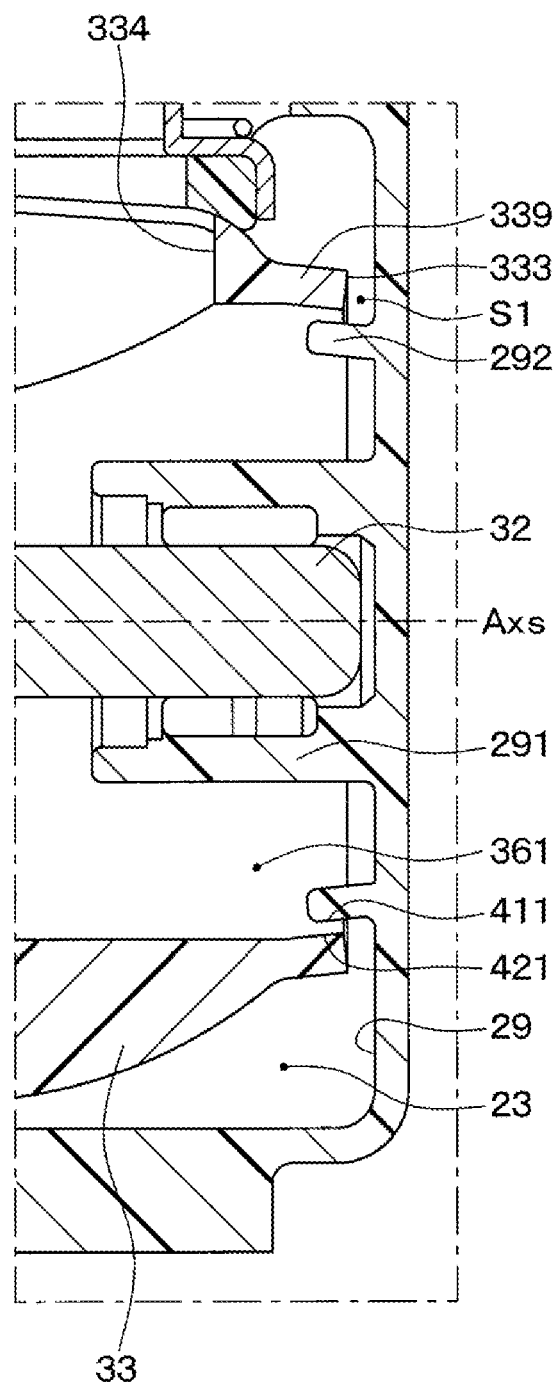
FIG. 18 is a cross-sectional view of a valve device in other embodiment corresponding to FIG. 7.
Figure 19:
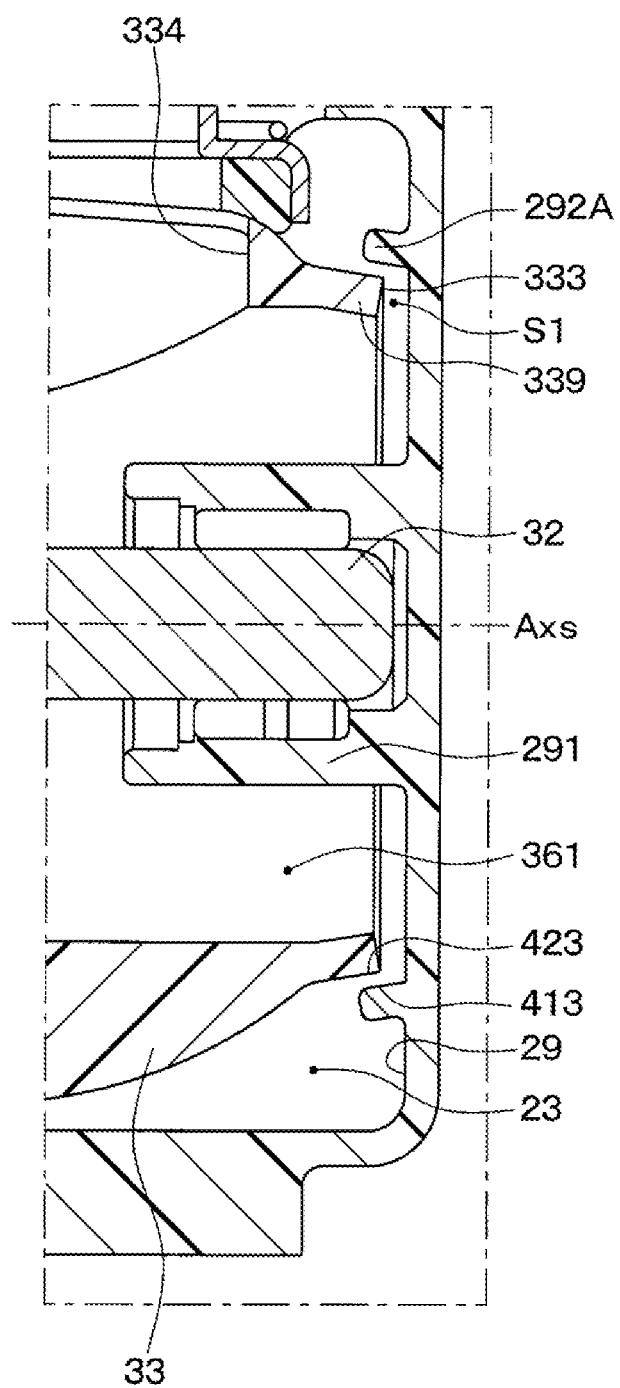
FIG. 19 is a cross-sectional view of a valve device in other embodiment corresponding to FIG. 13.

In the above-described embodiment, the example in which the inner diameter and the outer diameter of the bottom surface protrusions 292 and 292A are formed to have the same size from the root to the tip has been described, but the present disclosure is not limited to this. For example, as shown in FIGS. 18 and 19, when the first valve extending portion 339 is formed to be closer to the axis Axs in a direction toward the tip end of the first valve extending portion 339, the bottom surface protrusions 292, 292A may be formed to be further from the axis Axs in the direction toward the tip end of the first valve extending portion 339.

Specifically, the bottom surface protrusions 292 and 292A may be formed so that the inner diameter and the outer diameter thereof increase toward the tip end. In this case, as shown in FIG. 18, the bottom surface protrusion 292 may be located radially inward of the first valve outer surface 333 similarly to the first embodiment. As shown in FIG. 19, the bottom surface protrusion 292A may be located radially outward of the first valve outer surface 333 similarly to the second embodiment. The bottom surface protrusions 292, 292A may define a constant distance between the bottom surface protrusions 292, 292A and the first valve extending portion 339 or not.

Figure 20:
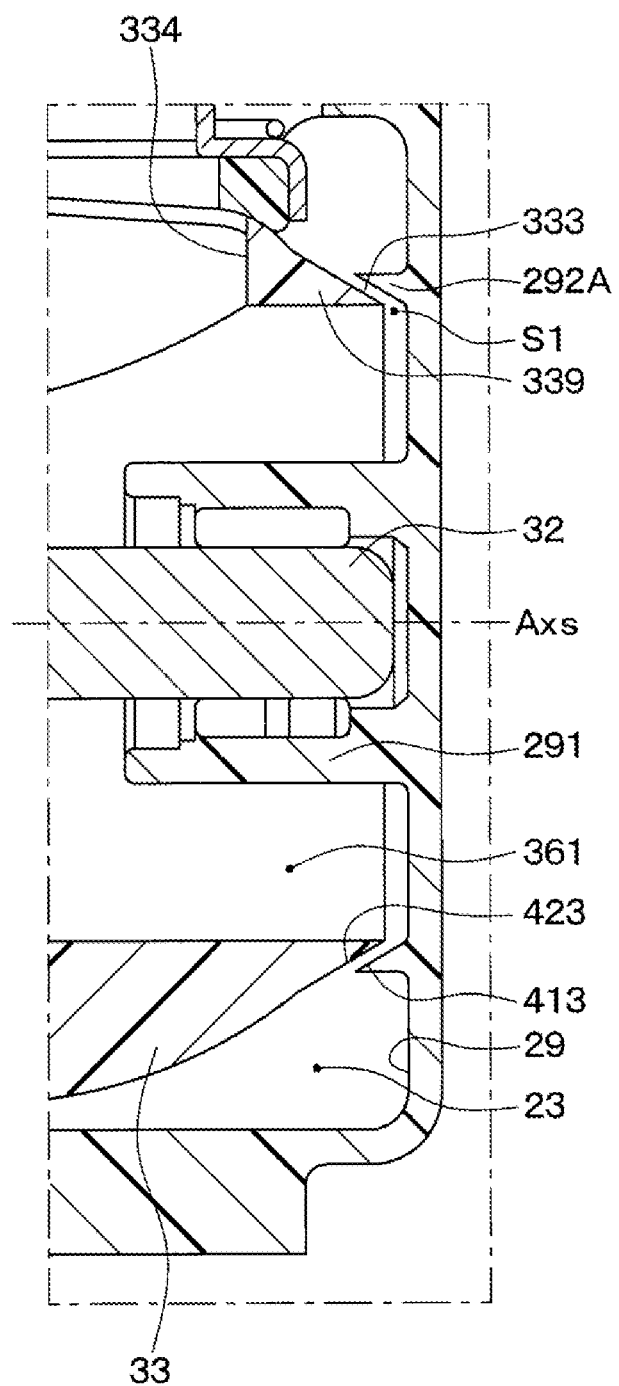
FIG. 20 is a cross-sectional view of a valve device in other embodiment corresponding to FIG. 13.
Figure 21:
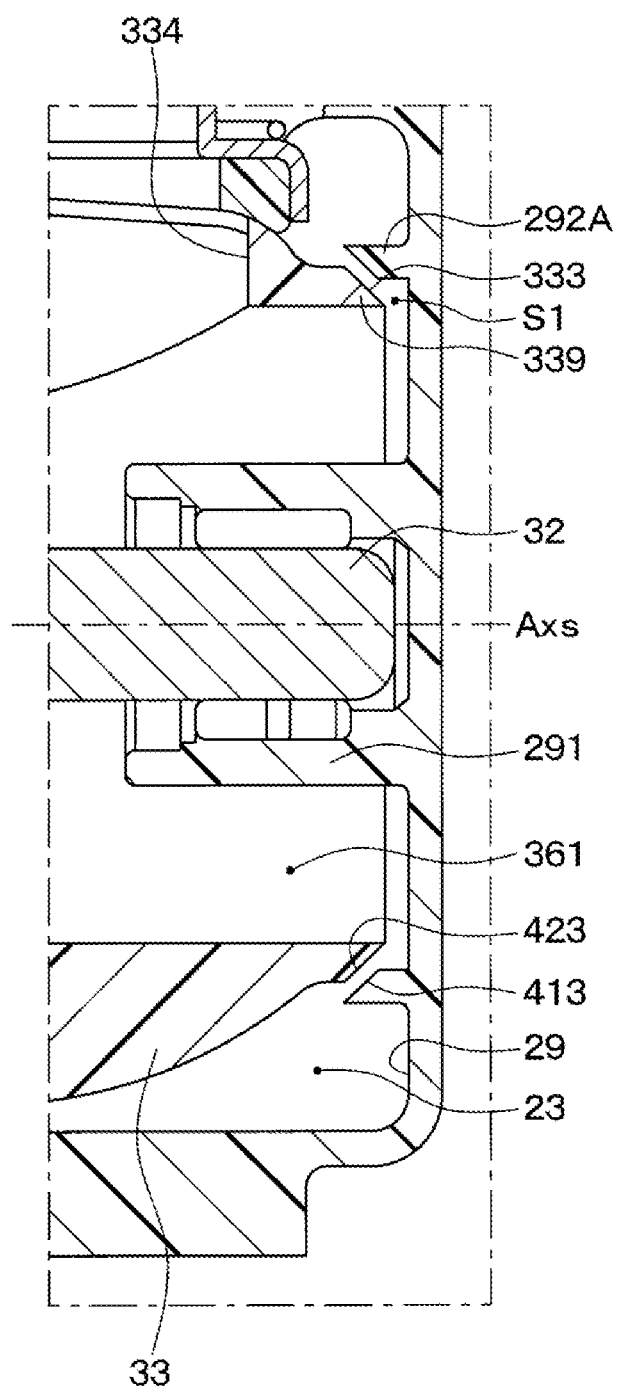
FIG. 21 is a cross-sectional view of a valve device in other embodiment corresponding to FIG. 13.

For example, as shown in FIGS. 20 and 21, when the outer diameter of the first valve extending portion 339 is formed to decrease toward the tip end of the first valve extending portion 339, the bottom surface protrusion 292A may be increased in an inner diameter in a direction toward the tip end.

For example, the bottom surface protrusion 292A is formed to have a constant outer diameter from the root end to the tip end of the bottom surface protrusion 292A, but at least a part of the inner diameter of the bottom surface protrusion 292A may have a size different from other portions of the bottom surface protrusion 292A from the root end to the tip end. Specifically, as shown in FIG. 20, the bottom surface protrusion 292A has an outer diameter that has a constant size from the root end to the tip end, while the inner diameter is decreased in size in a direction from the tip end to the root end. As shown in FIG. 21, the bottom surface protrusion 292A has the outer diameter having a constant size from the root end to the tip end, while the inner diameter has a first part having a constant size from the root end to the tip end and a second part having a larger size than the first part.

In the above-described embodiment, the example in which the bottom surface protrusions 292, 292A are formed on the housing inner bottom surface 29 and the closing surface protrusions 613, 613A are formed on the opening-closing surface 67 has been described, but the present disclosure is not limited to this. For example, the valve device 10 may have the bottom surface protrusions 292, 292A that are disposed on the housing inner bottom surface 29 and may not have the closing surface protrusions 613, 613A that are disposed on the opening-closing surface 67. Further, the valve device 10 may have the closing surface protrusion 613 and 613A that are disposed on the opening-closing surface 67 and may not have the bottom surface protrusions 292 and 292A that are disposed on the housing inner bottom surface 29.

In the above-described embodiment, an example in which only one of the bottom surface protrusions 292 and 292A is provided has been described, but the present disclosure is not limited to this. In the above-described embodiment, an example in which only one of the closing surface protrusions 613 and 613A is provided has been described, but the present disclosure is not limited to this. For example, the valve device 10 may have both the bottom surface protrusions 292 and 292A. The valve device 10 may have both the closing surface protrusions 613 and 613A.

In the above-described embodiment, an example in which the bottom surface protrusions 292, 292A are disposed radially inward or outward of the first valve outer surface 333 has been described, but the present disclosure is not limited to this. In addition, in the above-described embodiment, an example in which the closing surface protrusions 613 and 613A are disposed radially inward or outward of the third valve outer surface 352 has been described, but the present disclosure is not limited to this. In the valve device 10, the bottom surface protrusions 292, 292A may face the first valve outer surface 333 in the axial direction DRa. The closing surface protrusions 613 and 613A may face the third valve outer surface 352 in the axial direction DRa.

In the above-described embodiment, an example in which the bottom surface protrusions 292, 292A and the closing surface protrusions 613, 613A overlap with at least a part of the valve 30 in the radial direction DRr has been described, but the present disclosure is not limited to this. For example, the bottom surface protrusions 292, 292A and the closing surface protrusions 613, 613A may be formed not to overlap with the valve 30 in the radial direction DRr.

Further, in the above-described embodiment, an example in which the gap D1 is smaller than the gap between the shaft 32 and the first fluid resistance surface 411 in the radial direction DRr has been described, but the present disclosure is not limited to this. Further, in the above-described embodiment, an example in which the gap D2 is smaller than the gap between the shaft 32 and the second fluid resistance surface 412 in the radial direction DRr has been described, but the present disclosure is not limited to this.

For example, the valve device 10 may be configured such that the gap D1 is larger than the gap between the shaft 32 and the first fluid resistance surface 411 in the radial direction DRr. Additionally, the valve device 10 may be configured such that the gap D2 is larger than the gap between the shaft 32 and the second fluid resistance surface 412 in the radial direction DRr.

Further, in the above-described embodiment, an example in which each of the gap D1 and the gap D3 is smaller than the gap between the first valve outer surface 333 and the housing inner bottom surface 29 in the axial direction DRa has been described, but the present disclosure is not limited to this. In the above-described embodiment, an example in which each of the gap D2 and the gap D4 is smaller than the gap between the third valve outer surface 352 and the opening-closing surface 67 in the axial direction DRa has been described, but the present disclosure is not limited to this.

For example, the valve device 10 may be configured such that each of the gap D1 and the gap D3 are larger than the gap between the first valve outer surface 333 and the housing inner bottom surface 29 in the axial direction DRa. In addition, the valve device 10 may be configured such that each of the gap D2 and the gap D4 is larger than the gap between the third valve outer surface 352 and the opening-closing surface 67 in the axial direction DRa.

In the above-described embodiment, an example in which the bottom surface protrusions 292, 292A do not overlap with the first outer circumferential opening 334 in the radial direction DRr has been described, but the present disclosure is not limited to this. In the above-described embodiment, an example in which the closing surface protrusions 613 and 613A do not overlap with the third outer circumferential opening 354 in the radial direction DRr has been described, but the present disclosure is not limited to this. For example, the valve device 10 may be configured such that the bottom surface protrusions 292, 292A overlap with the first outer circumferential opening 334 in the radial direction DRr. Further, the valve device 10 may be configured such that the closing surface protrusions 613 and 613A overlap with the third outer circumferential opening 354 in the radial direction DRr.

In the above-described embodiment, an example in which the first valve outer circumferential portion 331 has the first valve extending portion 339 and the third valve outer circumferential portion 351 has the third valve extending portion 359 has been described, but the present disclosure is not limited to this. For example, the valve device 10 may be configured such that the first valve outer circumferential portion 331 does not have the first valve extending portion 339 and the third valve outer circumferential portion 351 does not have the third valve extending portion 359.

In the above-described embodiment, an example in which the valve-positioning portion 355 is located in the third valve 35 and the stopper 615 is located in the closing surface protrusion 613 has been described, but the present disclosure is not limited to this. The valve device 10 may be configured such that the valve-positioning portion 355 is located on the first valve 33 and the stopper 615 is located on the bottom surface protrusion 292. The valve device 10 may be configured without the valve-positioning portion 355 and the stopper 615.

In the above-described embodiment, an example in which the valve-positioning portion 355 is formed on the inner circumferential surface of the third valve outer circumferential portion 351 has been described, but the present disclosure is not limited to this. For example, the valve device 10 may be configured such that the valve-positioning portion 355 is located on the outer circumferential surface of the third valve outer circumferential portion 351. The valve device 10 may have two valve-positioning portions 355 located on both the outer circumferential surface and the inner circumferential surface of the third valve outer circumferential portion 351.

In the above-described embodiment, an example in which the connecting flat portion 317 is located in the shaft connecting portion 316 and the shaft flat portion 322 is located in the shaft outer circumferential portion 321 has been described, but the present disclosure is not limited to this. For example, the valve device 10 may not have the connecting flat portion 317 and the shaft flat portion 322.

In the above-described embodiment, the valve device 10 has the bottom surface protrusions 292, 292A, the closing surface protrusions 613, 613A, the connecting flat portion 317, and the shaft flat portion 322, but the present disclosure is not limited to this. For example, the valve device 10 may have the connecting flat portion 317 and the shaft flat portion 322 without both the bottom surface protrusions 292, 292A and the closing surface protrusions 613, 613A.

In the above-described embodiment, an example in which the connecting flat portion 317 overlaps with the valve-positioning portion 355 in the radial direction DRr has been described, but the present disclosure is not limited to this. For example, the valve device 10 may be arranged such that the connecting flat portion 317 does not overlap with the valve-positioning portion 355 in the radial direction DRr.

In the above-described embodiment, an example in which the valve device 10 has the bottom surface protrusions 292, 292A and the closing surface protrusions 613, 613A and in which the connecting flat portion 317 overlaps with the valve-positioning portion 355 in the radial direction DRr has been described. However, the present disclosure is not limited to this. For example, the valve device 10 may be configured such that the connecting flat portion 317 overlaps with the valve-positioning portion 355 in the radial direction DRr without both the bottom surface protrusions 292, 292A and the closing surface protrusions 613, 613A.

In the above-described embodiment, an example in which the assembling distance L1 is equal to or less than half the length of the valve 30 in the axial direction DRa has been described, but the present disclosure is not limited to this. For example, the valve device 10 may be configured such that the assembling distance L1 is larger than half the length of the valve 30 in the axial direction DRa.

In the above-described embodiment, an example in which the valve device 10 has the bottom surface protrusions 292, 292A and the closing surface protrusions 613, 613A and in which the assembling distance L1 is equal to or less than half the length of the valve 30 in the axial direction DRa is described. However, the present disclosure is not limited to this. An example in which the connecting flat portion 317 overlaps with the valve-positioning portion 355 in the radial direction DRr has been described, but the present disclosure is not limited to this. For example, the valve device 10 may be configured such that the assembling distance L1 is located at a position less than half the length of the valve 30 in the axial direction DRa without including the bottom surface protrusions 292, 292A and the closing surface protrusions 613, 613A.

What is claimed is:
1. A rotary-type valve device comprising:
a driving unit configured to transmit a rotational force;
a shaft configured to rotate by the rotational force transmitted from the driving unit;
a valve having a tubular shape and configured to rotate together with the shaft, the valve including an outer circumferential portion that is located outside of the shaft in a radial direction of the shaft and that defines an outer circumferential opening; and a housing defining:
  a valve housing space in which the valve is housed;
  an inlet opening at a position of the housing facing the outer circumferential portion, a fluid flowing into the valve housing space through the inlet opening from an outside of the valve housing space; and
  an outlet opening at a position of the housing facing the outer circumferential portion, the fluid flowing out of the valve housing space through the outlet opening, wherein the valve defines therein a passage through which the fluid flows, the valve includes a valve end surface that faces the housing in an axial direction of the shaft and that defines an end surface opening in fluid communication with the passage, the valve is configured to adjust an overlapping area between the outer circumferential opening and one of the inlet opening and the outlet opening in accordance with a rotational position of the valve, the housing includes a housing inner surface that faces the valve end surface, the valve is housed in the housing so that a gap is defined between the valve end surface and the housing inner surface, the housing inner surface includes a protrusion at a position radially outward of the shaft, and the protrusion protrudes in the axial direction from the housing inner surface.

2. The rotary-type valve device according to claim 1, wherein
  at least a portion of the protrusion is located radially inward of the valve end surface.

3. The rotary-type valve device according to claim 2, wherein
  the protrusion overlaps with at least a portion of the valve in the radial direction.

4. The rotary-type valve device according to claim 3, wherein
  the valve includes a resistance facing surface facing the protrusion in the radial direction,
  the protrusion includes a fluid resistance surface facing the resistance facing surface, and
  the protrusion is disposed such that a gap in the radial direction between the resistance facing surface and the fluid resistance surface is less than a gap in the radial direction between the shaft and the fluid resistance surface.

5. The rotary-type valve device according to claim 4, wherein
  the gap in the radial direction between the resistance facing surface and the fluid resistance surface is less than a gap in the axial direction between the valve end surface and the housing inner surface.

6. The rotary-type valve device according to claim 3, wherein
  the outer circumferential portion includes a valve extending portion between the outer circumferential opening and the valve end surface, and
  the valve extending portion extends toward the housing inner surface.

7. The rotary-type valve device according to claim 3, wherein
  the protrusion does not overlap with the outer circumferential opening in the radial direction.

8. The rotary-type valve device according to claim 3, wherein
  the valve includes a valve-positioning portion that defines a reference position for the valve in a circumferential direction of the valve,
  the valve positioning portion protrudes in the radial direction from at least one of an outer surface and an inner surface of the outer circumferential portion,
  the protrusion includes a stopper protruding in the radial direction toward the valve-positioning portion such that the stopper overlaps with the valve-positioning portion in the circumferential direction, and
  the stopper stops the valve at the reference position by engaging with the valve-positioning portion.

9. The rotary-type valve device according to claim 8, wherein
  the valve includes a shaft connecting portion having a cylindrical hollow shape, the shaft being connected to the valve by being inserted into the shaft connecting portion,
  the shaft connecting portion includes a connecting flat portion on an inner circumferential surface of the shaft connecting portion, the connecting flat portion having a flat shape,
  the shaft includes a shaft flat portion on an outer circumferential surface of the shaft, the shaft flat portion having a flat shape and being in contact with the connecting flat portion, and
  the connecting flat portion overlaps with the valve-positioning portion in the radial direction.

10. The rotary-type valve device according to claim 1, wherein
  at least a portion of the protrusion is located radially outward of the valve end surface.

11. The rotary-type valve device according to claim 1, wherein
  the valve includes a shaft connecting portion having a cylindrical hollow shape, the shaft being connected to the valve by being inserted into the shaft connecting portion,
  the shaft connecting portion includes a connecting flat portion on an inner circumferential surface of the shaft connecting portion, the connecting flat portion having a flat shape, and
  the shaft includes a shaft flat portion on an outer circumferential surface of the shaft, the shaft flat portion having a flat shape and being in contact with the connecting flat portion.

12. The rotary-type valve device according to claim 11, wherein
  the shaft has an end on one side of the axial direction, the end being connected to the driving unit,
  the valve end surface is located on the one side of the axial direction, and
  the valve has a length between the valve end surface and the connecting flat portion in the axial direction that is equal to or less than half of the total length of the valve in the axial direction.

* * * * *